United States Patent
Brown et al.

(10) Patent No.: US 7,162,164 B2
(45) Date of Patent: Jan. 9, 2007

(54) OPTICAL VESTIGIAL SIDEBAND TRANSMITTER/RECEIVER

(75) Inventors: Carlton D. Brown, Richardson, TX (US); David J. Butler, Richardson, TX (US)

(73) Assignee: Alcatel, Paris (FR)

(*) Notice: Subject to any disclaimer, the term of this patent is extended or adjusted under 35 U.S.C. 154(b) by 781 days.

(21) Appl. No.: 10/173,378

(22) Filed: Jun. 17, 2002

(65) Prior Publication Data

US 2003/0231889 A1    Dec. 18, 2003

(51) Int. Cl.
*H04B 10/04* (2006.01)
*H04B 10/06* (2006.01)

(52) U.S. Cl. .................. 398/183; 398/201; 398/212

(58) Field of Classification Search ............... 398/183, 398/212, 196
See application file for complete search history.

(56) References Cited

U.S. PATENT DOCUMENTS

| | | | |
|---|---|---|---|
| 5,999,300 | A | 12/1999 | Davies et al. |
| 6,118,562 | A | 9/2000 | Lee et al. |
| 6,262,834 | B1 | 7/2001 | Nichols et al. |
| 2003/0058509 | A1* | 3/2003 | Webb et al. .......... 359/187 |
| 2004/0208583 | A1* | 10/2004 | Azadet et al. .......... 398/85 |
| 2004/0208644 | A1* | 10/2004 | Sirat et al. .......... 398/186 |

FOREIGN PATENT DOCUMENTS

EP    0 715 191 A2    6/1996
WO    WO 97/49248    12/1997

OTHER PUBLICATIONS

S. Bigo et al., "5.12 Tbit/s (128×40 Gbit/s WDM) Transmission over 3×100 km of TeraLightTM Fibre", ECOC 2000.*
J. Lee et al., "Multi-Channel Frequency Stabilization Using Wavelength Crossover Properties of Arrayed Waveguide Gating", 10th Annual Meeting Lasers and Electro-Optics 1997, LEOS '97, Nov. 10-13, 1997.*

* cited by examiner

*Primary Examiner*—Shi K. Li
(74) *Attorney, Agent, or Firm*—Jessica W. Smith; V. Lawrence Sewell

(57) ABSTRACT

An optical vestigial sideband transmitter includes first and second intensity-modulated light sources and a pair of optical splitters. A first and second wavelength combiner receives a portion of the outputs of the first and second intensity-modulated light sources. The first wavelength combiner filters the two modulated signals to generate two vestigial sideband signals and multiplexes them onto a single waveguide such as an optical fiber for output to an optical transmission medium. The second wavelength combiner operates in conjunction with the first wavelength combiner to automatically and precisely regulate the optical wavelengths of the light sources, such that the passband of the first wavelength combiner substantially suppresses the redundant sideband from each modulated signal. After transmission, a vestigial sideband receiver including a wavelength splitter and optical-to-electrical receivers extracts the multiplicity of vestigial sideband signals placing them on separate optical waveguides.

9 Claims, 18 Drawing Sheets

OPTICAL VESTIGIAL SIDEBAND TRANSMITTER/RECEIVER

TECHNICAL FIELD OF THE INVENTION

The present invention relates to optical communications systems, and more particularly to an optical vestigial sideband transmitter/receiver.

BACKGROUND OF THE INVENTION

In optical communications systems, conventional intensity modulation creates an optical spectrum that is mirror-imaged about the central carrier wavelength. The spectrum on either side of the carrier wavelength is mutually redundant, since only one side is actually needed to convey data. Therefore, these typical approaches use about twice the bandwidth that is actually required. Vestigial sideband (VSB) transmission is a known technique for reducing bandwidth and power requirements. However, prior VSB solutions have been hampered by their inability to control the wavelengths of the optical carriers with sufficient accuracy relative to the optical filters utilized in optical communications systems. Furthermore, the typical VSB implementations have been hampered by their complexity and associated cost.

Therefore a need exits for an improved vestigial sideband transmitter/receiver to dynamically control the wavelengths of the optical signals relative to the optical filters needed to suppress the unwanted sidebands. Furthermore, the bandwidth reduction afforded by the improved vestigial sideband transmitter/receiver is required to avoid problems associated with chromatic dispersion. This is particularly important for data rates of 10 Gb/s, 40 Gb/s, and higher. Furthermore, the bandwidth reduction afforded by the improved vestigial sideband transmitter/receiver is needed to improve the optical amplifier's ability to effectively boost the power of the aggregated VSB signals for transmission over long distances. Furthermore, an improved vestigial sideband transmitter/receiver is needed to provide an economical and practical increase in the data capacity of fiber optic transmission systems.

SUMMARY OF THE INVENTION

In accordance with the present invention, an optical vestigial sideband transmitter is provided. The transmitter provides two or more optical vestigial sideband signals. In one embodiment, in which two vestigial sideband signals are generated, the transmitter includes first and second intensity modulated light sources, and a pair of wavelength combiners. A first wavelength combiner receives half of the optical power from each of the intensity modulated light sources. A second wavelength combiner receives the other half of the optical power from each of the intensity modulated light sources. The first wavelength combiner filters the two modulated signals to generate two vestigial sideband signals and multiplexes them onto a single light path such as an optical fiber for output to an optical transmission medium such as an optical fiber. The second wavelength combiner operates in conjunction with the first combiner to precisely regulate the optical wavelengths of the light sources such that the optical filter characteristics of the first wavelength combiner substantially suppress the redundant (and unwanted) sideband from each modulated signal. The passbands of the second wavelength combiner must be shifted 180° relative to the passbands of the first combiner to provide this control. Photodetectors at the output of each combiner convert a portion of the optical signals to electrical signals and send them to electronic filters and feedback control circuits. These circuits generate control signals to regulate the center wavelengths of the light sources relative to the wavelength positions of the passbands of the first and second wavelength combiners, such that the average optical power of the signals emerging from the first wavelength combiner are substantially equal to the average optical power of the signals emerging from the second wavelength combiner. It is important to emphasize that the wavelength combiners which filter out the unwanted sidebands and which combine multiple VSB signals onto a single fiber may be implemented with any wavelength selective technology providing features such as N:1 interleaving or N:1 multiplexing.

BRIEF DESCRIPTION OF THE DRAWINGS

For a more complete understanding of the present invention and for further advantages thereof, reference is now made to the following Description of the Preferred Embodiments taken in conjunction with the accompanying drawings in which.

DESCRIPTION OF THE PREFERRED EMBODIMENTS

Prior wavelength division multiplex (WDM) transmission systems attempted to place the optical wavelength of each laser source as close to the center of each optical channel as possible. Generally, the optical bandwidth available to any given channel was primarily limited by the wavelength combiners used to place multiple optical signals onto one fiber. The wavelength combiners perform low-loss optical multiplexing, but do so at the expense of optical bandwidth available at the inputs. In other words, the wavelength combiners perform optical filtering on the inputs. Traditionally, this filtering was undesirable. Manufactures have traditionally attempted to maximize the bandwidth available to each input of their wavelength combiners, and system designers have attempted to locate the carrier wavelengths as close to the center of each filter's passband as possible.

Figure 1:
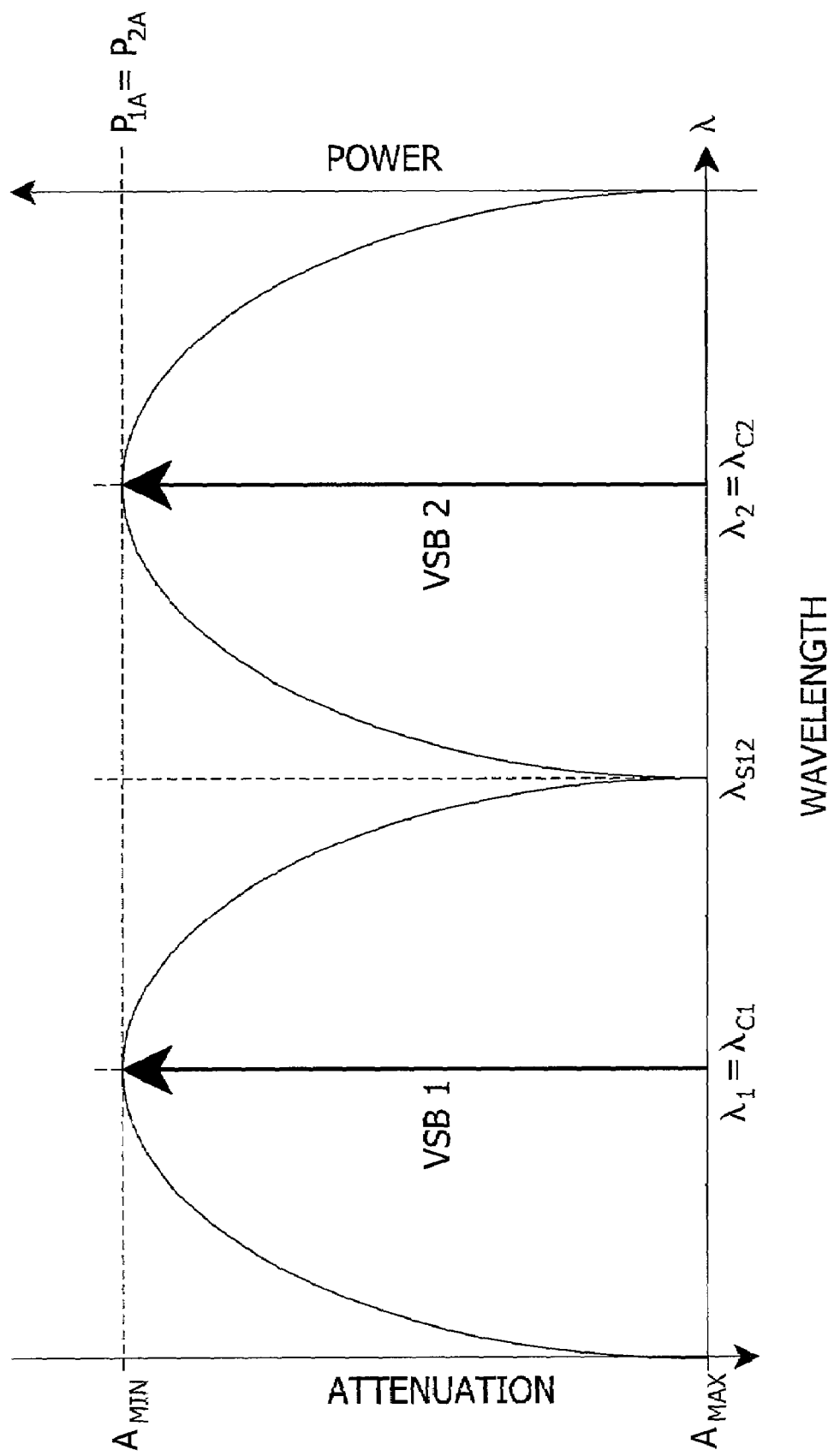
FIG. 1 is a graph illustrating two carrier wavelengths centered within the passbands of a wavelength combiner.

FIG. 1 is a graph of the passband characteristics of a typical 2:1 wavelength combiner superimposed with two optical carrier wavelengths. The first arc, shown on the left side of the graph, is a passband representing the attenuation as a function of wavelength between the first input of the 2:1 wavelength combiner and the output of the 2:1 wavelength combiner. The second arc, shown on the right side of the graph, represents the attenuation as a function of wavelength between the second input of the 2:1 wavelength combiner and the output of the 2:1 wavelength combiner. The first vertical arrow, located on the left side of the graph, represents a WDM optical carrier with wavelength, labeled $\lambda_1$, having an average signal power at the output of the combiner, labeled $P_{1A}$. Similarly, the second vertical arrow, located on the right side of the graph, represents a WDM optical carrier with wavelength, labeled $\lambda_2$, having an average signal power at the output of the combiner, labeled $P_{2A}$. The carrier wavelengths of both signals are located at the point of least attenuation, labeled $A_{min}$, which corresponds to the center of each passband, labeled, $\lambda_{C1}$ and $\lambda_{C2}$. The passbands illustrated in FIG. 1 follow a cosine shape that is typical of wavelength combiners intended for WDM systems.

As long as the bandwidth of the signal modulated onto the optical carrier is small compared to the bandwidth defined by the wavelength combiner, no significant attenuation of the signal will occur as long as the carrier wavelengths are located near the center of their respective passbands, $\lambda_{C1}$ and $\lambda_{C2}$ as indicated in FIG. 1. However, if the bandwidth of the modulating signal becomes larger due to increasing modulation rates, or if the optical bandwidth of the wavelength combiner becomes smaller due to an increasing number of optical channels within a WDM system, then bandwidth-limiting of the modulated optical signal is inevitable as it passes through the wavelength combiner. Bandwidth-limiting is inevitable in the wavelength splitter at the receiver for similar reasons as well. The bandwidth-limiting at both the transmitter end and at the receiver end produce attenuation of the transmitted signals that is not constant with respect to wavelength and can have disastrous effects on the information content of each optical signal.

Figure 2:
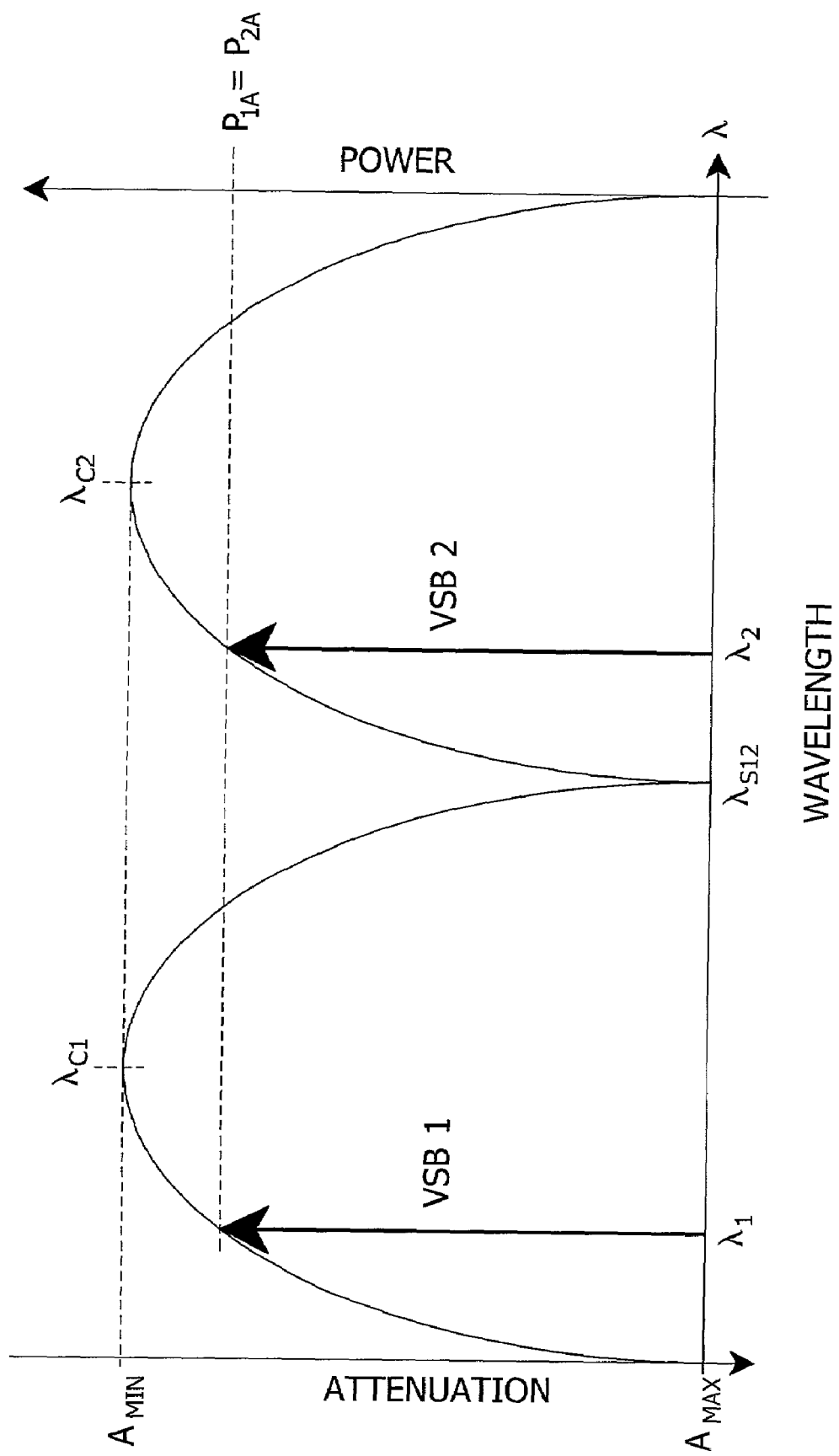
FIG. 2 is a graph illustrating two carrier wavelengths left-justified within the passbands of a wavelength combiner.

However, in accordance with the present invention, bandwidth-limiting can be mitigated and used to advantage, if the optical carrier wavelengths are not placed at the center of the bandwidth-limiting passbands, but instead are carefully located at one side of the passbands so that only one side of each modulated spectrum is significantly attenuated by the passbands of the wavelength combiner. FIG. 2 is a graph that illustrates this arrangement, in which the passbands for each input of a 2:1 wavelength combiner are superimposed with optical carrier wavelengths that are somewhat left-justified within the passband of each optical input to the wavelength combiner. This shift has the effect of attenuating the left side of each modulated spectrum while preserving most of the right side of each modulated spectrum so that error-free transmission may occur. Furthermore, this shift reduces the bandwidth of each modulated spectrum, which, in turn reduces the deleterious effects of chromatic dispersion present in most commercially available single-mode optical fiber which is particularly important at 10 Gb/s data rates and higher.

However, the carrier wavelengths must be located very accurately relative to the passbands of any filters (such as those found in wavelength splitters or combiners) in order to provide optimal performance. Specifically, the carrier wavelengths must be located near one edge of the filter passbands so as to attenuate the optical power of the carrier wavelengths by approximately 3 dB relative to the region of minimum attenuation imposed by the passbands. This location significantly reduces the unwanted sideband to a vestige of the original signal while preserving most of the desired sideband for transmission. Prior designs are hampered by their inability to accurately and automatically position their carrier wavelengths at or near this position relative to the edge of the filter passbands.

Figure 3:
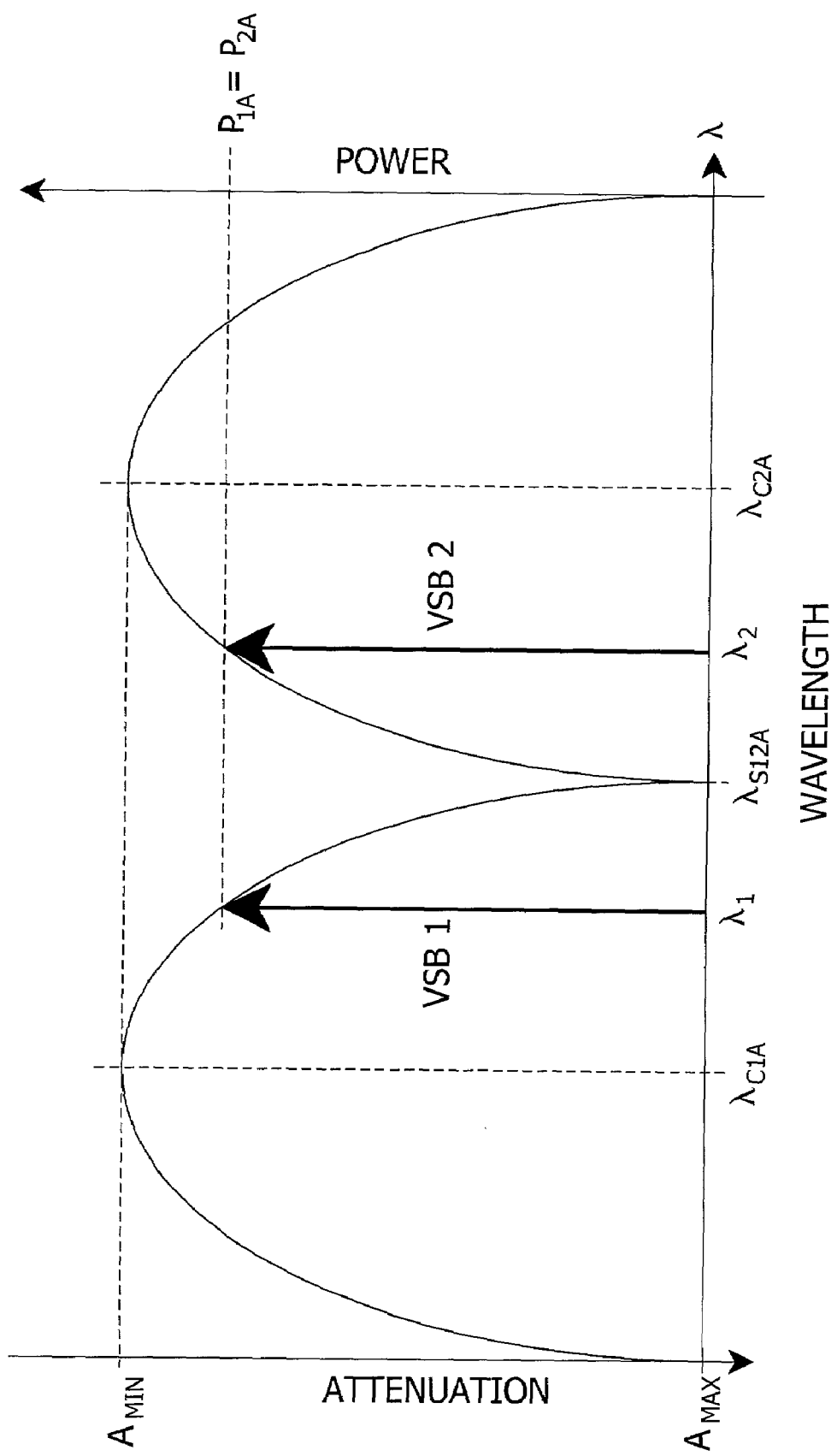
FIG. 3 is a graph illustrating two carrier wavelengths in which the first is right-justified and the second is left-justified within the passbands of a wavelength combiner.

However, the present invention provides automatic and accurate control of the carrier wavelengths relative to the edge of the filter passbands by pairing the carrier wavelengths as shown in the graph of FIG. 3. FIG. 3 illustrates an embodiment of the present invention in which the carrier wavelengths are offset and paired towards each other, such that one carrier wavelength is right-justified within the passband of a first input to the wavelength combiner, and the other carrier wavelength is left-justified within a second input to the wavelength combiner. The pairing of the carrier wavelengths in this manner enables automatic and accurate control of the relationship between these wavelengths and the passbands of the wavelength combiners that provide the filtering which will be explained in subsequent detail.

Figure 4:
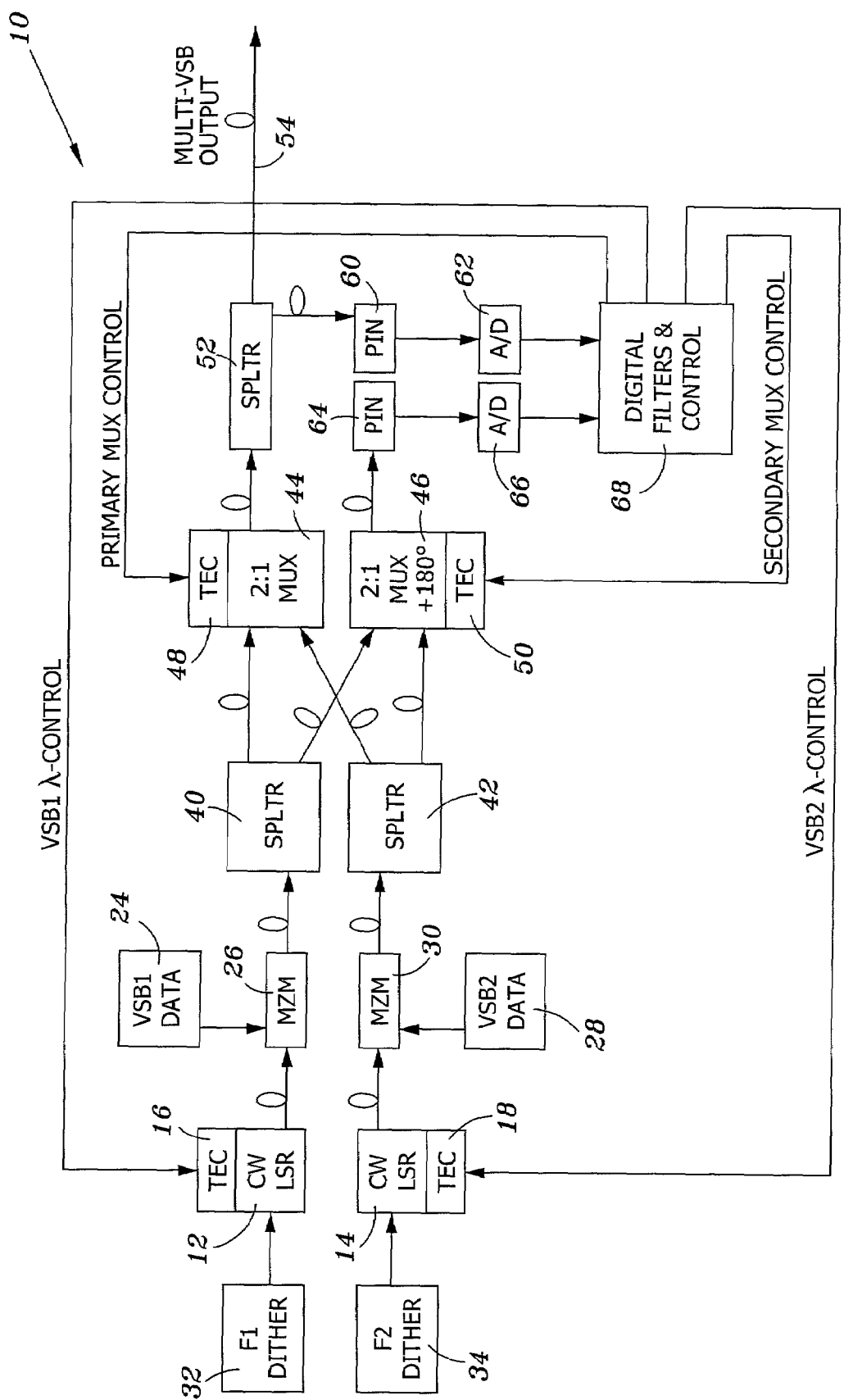
FIG. 4 is a block diagram of the present vestigial sideband transmitter in the two-channel embodiment.

FIG. 4 illustrates a block diagram of a present paired, vestigial sideband transmitter, generally identified by the numeral 10. Transmitter 10 transmits a pair of vestigial sideband signals in an optical communications system. Transmitter 10 includes first and second CW lasers 12 and 14. Laser 12 includes a thermoelectric cooler 16. Laser 14 includes a thermoelectric cooler 18. Laser 12 is externally modulated by an independent data source 24 (VSB 1 Data) utilizing a modulator 26 such as, for example, a Mach-Zehnder modulator (MZM). Laser 14 is externally modulated by a data source 28 (VSB 2 Data) utilizing a modulator 30. Modulator 30 may comprise, for example, a MZM. Laser 12 is dithered by a unique channel identification frequency at block 32. Laser 14 is dithered by a unique channel identification frequency at block 34.

It will be understood by those skilled in the art, that CW lasers 12 and 14, working in conjunction with external modulators 26 and 30, generate a pair of intensity-modulated light sources that are modulated by the data sources 24 and 28 and whose carrier wavelengths are tunable using thermoelectric coolers 16 and 18. Furthermore, it will be understood by those skilled in the art, that there are many other ways to create intensity-modulated light sources with tunable carrier wavelengths. For example, a laser may be dithered by a unique dither frequency and directly modulated by the data source to create an intensity-modulated light source. Furthermore, it will be understood by those skilled in the art, that there are many other varieties of intensity modulation, such as, for example, return-to-zero modulation which simply provide other embodiments of the present invention. Furthermore, it will be understood by those skilled in the art, that there are many other ways to tune the carrier wavelength of an intensity-modulated light source besides the thermoelectric coolers provided as an example. The present invention is independent of the specific techniques used to create the tunable, intensity-modulated light source; the specific examples are provided for illustrative purposes only.

Returning to FIG. 4, the optical outputs of modulators 26 and 30 produce intensity-modulated spectra that is mirror-imaged about the central carrier wavelengths of their respective CW lasers 12 and 14 that drive them. The output of modulator 26 is received by a splitter 40. The output of modulator 30 is received by a splitter 42. The outputs of splitter 40 are applied to 2:1 wavelength combiners 44 and 46. The outputs of splitter 42 are also applied to wavelength combiners 44 and 46. The wavelength position of the passbands of the wavelength combiner 44 is adjustable using, for example, the temperature control of the wavelength combiner 44 using, for example, a thermoelectric cooler 48. The wavelength position of the passbands of the wavelength combiner 46 is adjustable using, for example, the temperature control of the wavelength combiner 46 using, for example, a thermoelectric cooler 50. Each optical splitter 40 and 42 provides equal portions of the modulated signals to wavelength combiners 44 and 46. Wavelength combiner 44 filters out an unnecessary sideband from each signal and multiplexes the resulting spectrum onto a single optical fiber. Wavelength combiner 44 supplies its output to a splitter 52 and provides the multiple vestigial sideband output from transmitter 10 on output fiber 54. Wavelength combiner 46 facilitates the precise wavelength control of the carrier wavelengths relative to wavelength combiner 44 in accordance with the present invention.

As mentioned earlier, the carrier wavelengths of the intensity-modulated signals must be accurately positioned relative to the passbands of the first and second wavelength combiners 44 and 46 in order to achieve the desired suppression of the unwanted sidebands. The present wavelength alignment between the wavelength combiners and the intensity-modulated light sources is accomplished in two stages using the following methods.

It is useful to summarize the alignment before describing in detail. In the first stage of the alignment process, the passbands of the second wavelength combiner 46 are adjusted so that they are shifted by 180° relative to the first wavelength combiner 44. The absolute wavelengths and even the difference between the two wavelengths of CW lasers 12 and 14 are not critical during this stage as long as the difference between the wavelengths is less than the channel spacing supported by the wavelength combiner 44 and as long as each wavelength is located anywhere between the center of each passband and the stopband that separates the two channels. In the second and final phase of the alignment process, each carrier wavelength is adjusted to a position corresponding to the intersection of the passbands of the two wavelength combiners 44 and 46. Because of the 180° relationship between the passbands of the wavelength combiners 44 and 46, these intersection points correspond to the 3 dB wavelengths needed for optimal vestigial sideband filtering. Furthermore, differential power measurements between the filtered optical outputs from the first and second wavelength combiners 44 and 46 are used to automatically locate each carrier wavelength at the precise point of intersection.

Having summarized the alignment, a detailed description of the alignment will now be provided. Initially, one of the wavelength combiners 44 or 46 must be used as the reference to guide the shifting of the passbands of the other wavelength combiner by 180°. Although the selection of the reference combiner for this purpose is largely arbitrary, the first wavelength combiner 44 is selected as the reference simply to describe the method. Initially, the carrier wavelength of the first intensity-modulated light source may lie anywhere between the center wavelength of the passband of the first channel of wavelength combiner 44, depicted in FIG. 3 as $\lambda_{C1A}$, and the stopband between the first and second channels of wavelength combiner 44, depicted in FIG. 3 as $\lambda_{S12A}$. Similarly, the carrier wavelength of the second intensity-modulated light source may lie anywhere between the center wavelength of the passband of the second channel of wavelength combiner 44, depicted in FIG. 3 as $\lambda_{C2A}$, and the stopband between the first and second channels of wavelength combiner 44.

Figure 5:
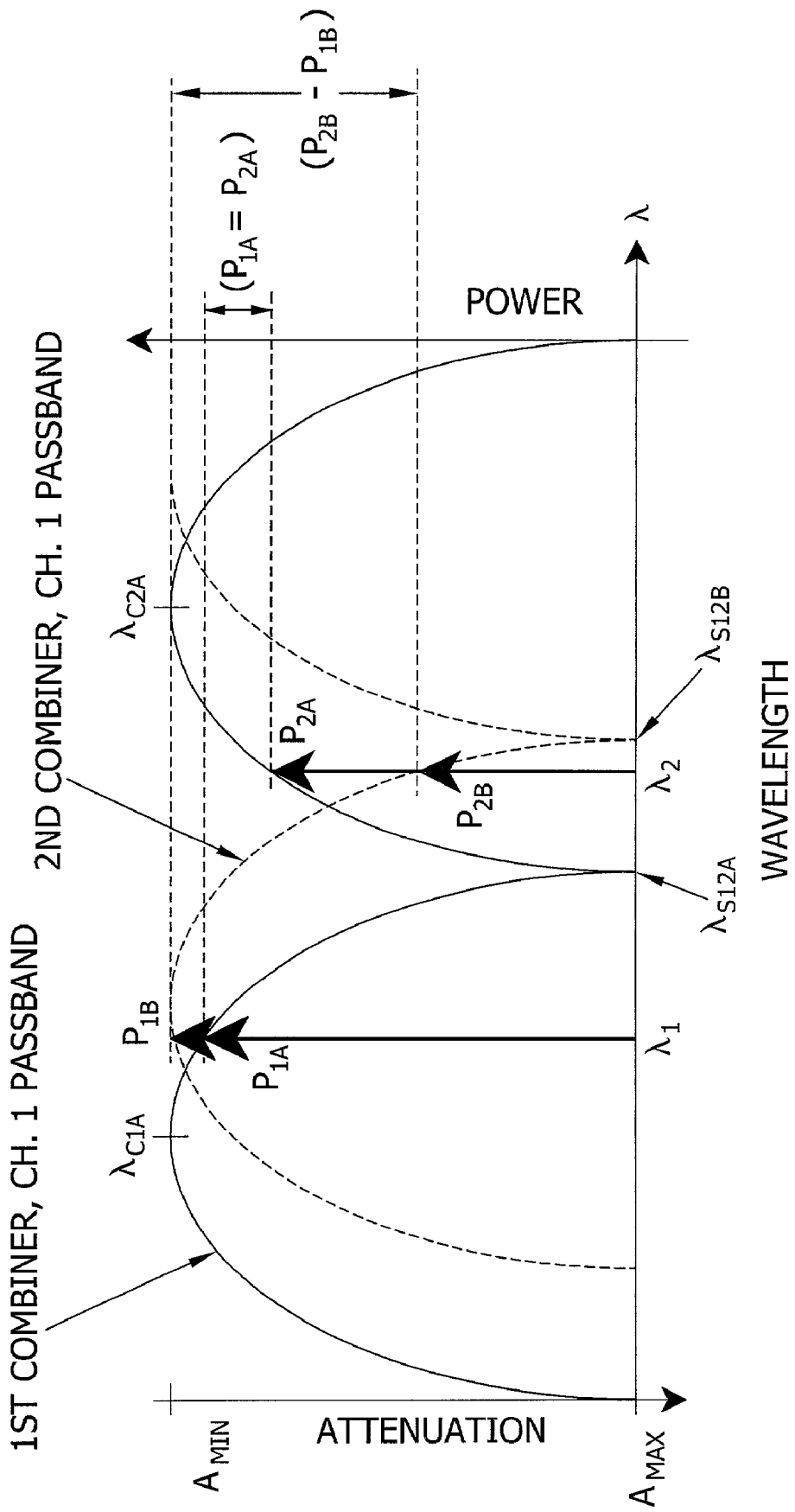
FIG. 5 is a graph illustrating the passbands of two wavelength combiners in which one set of passbands are shifted less than 180° relative to the other set.

Assuming the first wavelength combiner is used as the reference, the initial shift in the passbands of the second wavelength combiner 46 relative to the first combiner 44 must be greater than 0° but less than 360°. FIG. 5 is a graph illustrating one such condition in which the phase shift of the second wavelength combiner 46 is less than 180°. In FIG. 5, the solid arcs depict the passbands of the first wavelength combiner 44, and the dashed arcs depict the passbands of the second wavelength combiner 46 for reference. The carrier wavelengths, labeled $\lambda_1$, and $\lambda_2$, produce unique power levels at the output of each combiner 44 and 46. The unique power levels emerging from the first wavelength combiner 44 and corresponding to the carrier wavelengths, $\lambda_1$ and $\lambda_2$, are indicated by $P_{1A}$ and $P_{2A}$ respectively. The unique power levels emerging from the second wavelength combiner 46 and corresponding to the carrier wavelengths, $\lambda_1$ and $\lambda_2$, are indicated by $P_{1B}$ and $P_{2B}$ respectively. The difference between the right and left-justified signals emerging from the first wavelength combiner 44 compared to the difference between the right and left-justified signals from the second wavelength combiner 46 yields a net positive value. Specifically, this comparison is indicated as:

$$(P_{1A}-P_{2A})-(P_{2B}-P_{1B}) \qquad (1)$$

$$\phi_{SE} \equiv 180° - (360°/\lambda_{C2}-\lambda_{C1})(\lambda_{S12B}-\lambda_{S12A}) \qquad (2)$$

$$\phi_{SE} = (P_{1A}-P_{2A})-(P_{2B}-P_{1B}) \qquad (3)$$

$$\phi_{SE} = (P_{1A}+P_{1B})-(P_{2A}+P_{2B}) \qquad (4)$$

Figure 6:
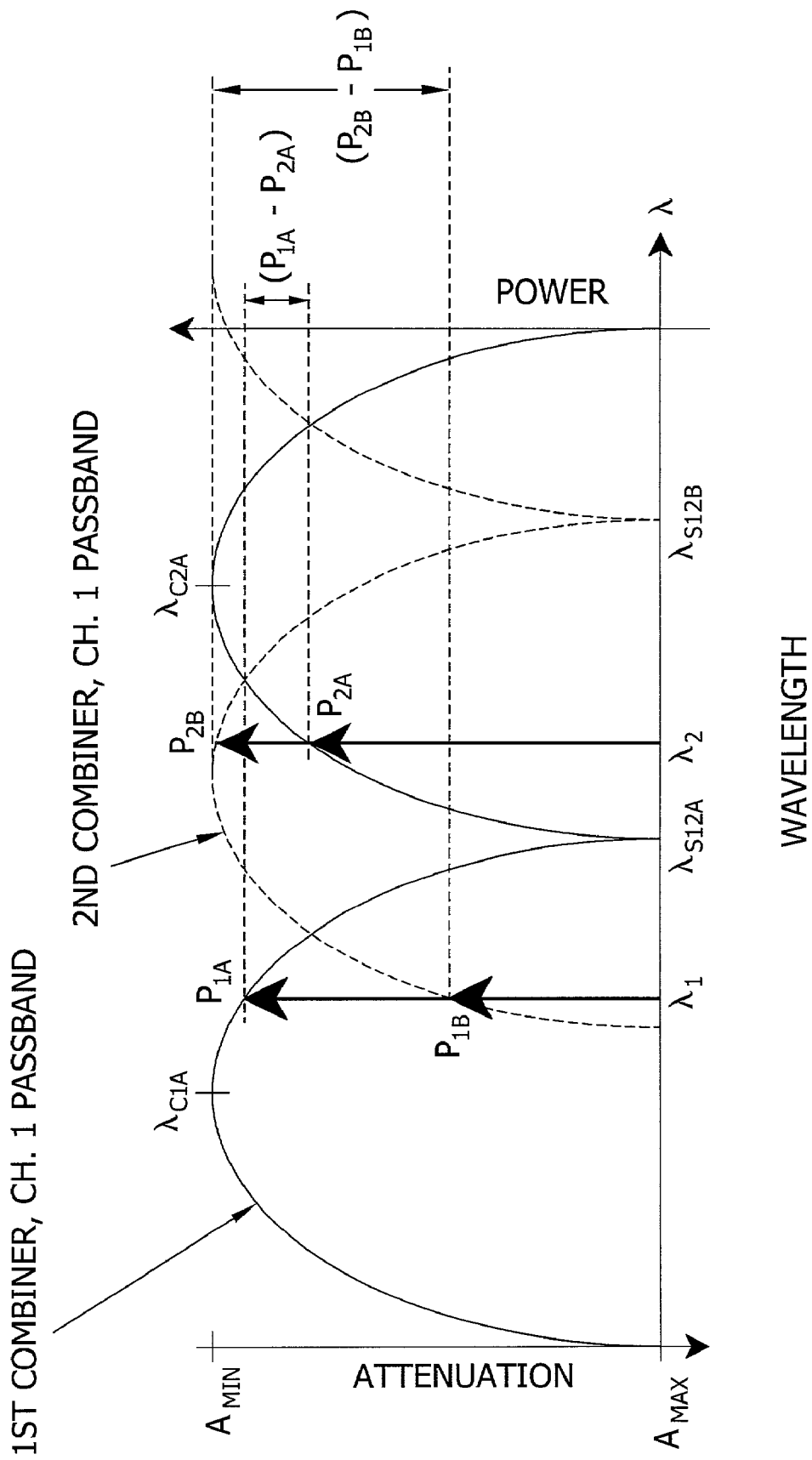
FIG. 6 is a graph illustrating the passbands of two wavelength combiners in which one set of passbands are shifted more than 180° relative to the other set.

FIG. 6 is a graph illustrating a complimentary condition in which the phase shift of the passbands of the second wavelength combiner 46 is greater than 180°. Here, the difference between the right and left-justified signals emerging from the first wavelength combiner 44 compared to the difference between the right and left-justified signals from the second wavelength combiner 46 yields a net negative value. More specifically, the expression $(P_{1A}-P_{2A})-(P_{2B}-P_{1B})$ is negative.

Figure 7:
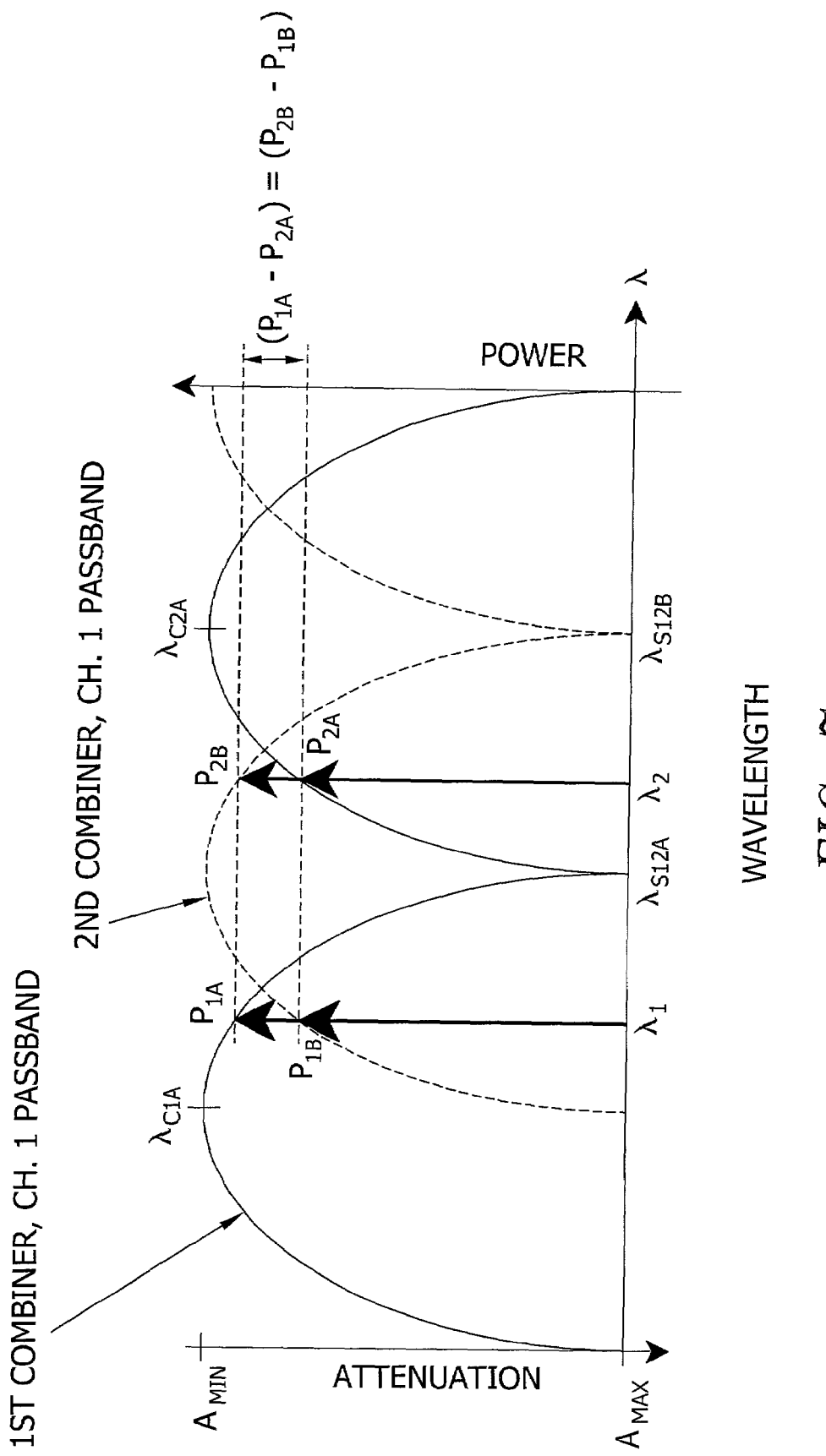
FIG. 7 is a graph illustrating the passbands of two 2:1 wavelength combiners in which one set of passbands are shifted 180° relative to the other set.

FIG. 7 is a graph illustrating the desired condition in which the phase shift of the passbands of the second wavelength combiner 46 is precisely 180°. Here, the difference between the right and left-justified signals emerging from the first wavelength combiner 44 compared to the difference between the right and left-justified signals from the second wavelength combiner 46 yields a net zero value. More specifically, the expression $(P_{1A}-P_{2A})-(P_{2B}-P_{1B})$ is zero. In the present invention, these comparisons provide a feedback control to automatically shift the passbands of the second wavelength combiner 46 relative to the first wavelength combiner 44 by 180°. Furthermore, these comparisons provide a negative feedback control for the shifting of the passbands of the second wavelength combiner 46 relative to the first wavelength combiner 44 even though the wavelength positions, $\lambda_1$ and $\lambda_2$, can have any value as long as $\lambda_1$ is initially located between $\lambda_{C1A}$ and $\lambda_{S12A}$, and as long as $\lambda_2$ is initially located between $\lambda_{C2A}$ and $\lambda_{S12A}$.

This behavior can be expressed mathematically by defining several additional terms. Let $\lambda_{S12B}$ equal the center of the stopband separating the passbands of the second wavelength combiner 46. Let $P_{nom}$ equal the average, unfiltered optical power for each intensity-modulated signal entering each input of wavelength combiner 44 and each input of wavelength combiner 46 with linear units of power measured in Watts. Let $A_{min}$ equal the minimum attenuation between the inputs of wavelength combiners 44 and 46 and the outputs. Ideally, $A_{min}$ has a unit-less value close to but not greater than 1. As shown in the Figures, $A_{min}$ occurs substantially close to the center of each passband for each channel in wavelength combiners 44 and 46. Let $A_{max}$ equal the maximum attenuation between the inputs of wavelength combiners 44 and 46 and the outputs. Ideally, $A_{max}$ has a unit-less value close to but greater than 0. Contrary to the subscripts, $A_{max}$ must always be less than $A_{min}$. Ideally, $A_{min}$ occurs between the passbands of each channel in wavelength combiners 44 and 46, substantially close to the stopbands of wavelength combiners 44 and 46 located at, $\lambda_{S12A}$ and $\lambda_{S12B}$ respectively. $\lambda_{C1A}$ has already been defined as the center of the passband for the right-justified signal in wavelength combiner 44 and has units of length in meters. Similarly, $\lambda_{C2A}$ has already been defined as the center of the passband for the left-justified signal in wavelength combiner 44 and has units of length in meters. Let $\lambda_{spacing}$ equal the channel spacing for wavelength combiners 44 and 46. $\lambda_{spacing}$ defines the periodicity of the passbands within wavelength combiners 44 and 46.

By these definitions, $\lambda_{spacing}=\lambda_{C2A}-\lambda_{C1A}$. Implicitly, wavelength combiners 44 and 46 have the same value for $\lambda_{spacing}$. The best choice for the value of $\lambda_{spacing}$ is driven by the same factors that would determine the best choice for $\lambda_{spacing}$ in a traditional DWDM system. Those skilled in the art are aware of these factors as well as the need to balance the technical limitations of any technology used in and with the wavelength combiners against the economic limitations of the end users of the system. The present invention does not depend on any specific value for $\lambda_{spacing}$. However, the widespread use of the term "channel spacing" among those skilled in the art makes this term useful in describing the important characteristics of the preferred embodiments.

Using the definitions previously described, the phase-shift error, $\phi_{SE}$, between the first and second wavelength combiners 44 and 46 can be described mathematically. The phase-shift error, $\phi_{SE}$, is defined mathematically as:

$$\phi_{SE}=180°-(360°/\lambda_{spacing})(\lambda_{S12B}-\lambda_{S12A}). \qquad (5)$$

As defined, the phase-shift error will be zero when the difference between the stopbands of the first wavelength combiner 44 and the second wavelength combiner 46 are substantially equal to half of the channel spacing. With the previous definitions, the phase-shift error is related mathematically to the optical power emerging from the outputs of the first and second wavelength combiners 44 and 46 as:

$$\phi_{SE}=[90°/(P_{nom}A_{min})][(P_{1A}-P_{2A})-(P_{2B}-P_{1B})]. \qquad (6)$$

This expression can be rearranged algebraically as:

$$\phi_{SE}=[90°/(P_{nom}A_{min})][(P_{1A}+P_{1B})-(P_{2A}+P_{2B})]. \qquad (7)$$

This form of the equation (7) correctly indicates that the phase-shift error is proportional to the difference between the sum of the right-justified signals emerging from both wavelength combiners 44 and 46 and the sum of the left-justified signals emerging from both wavelength combiners 44 and 46.

In order for this equation (7) to be substantially accurate, the difference between the carrier wavelength of the right-justified signal, $\lambda_1$, and the left-justified signal, $\lambda_2$, must be less than $\lambda_{spacing}$. Also, the shape of the passbands on either side of $\lambda_{S12A}$ and $\lambda_{S12B}$ must be symmetrical. Passbands described by Gaussian transfer functions or by cosine transfer functions are examples of wavelength combiners familiar to those skilled in the art that exhibit this symmetry. Furthermore the value of $A_{min}$ must be substantially greater than $A_{max}$. Those skilled in the art will be aware that many wavelength combiner technologies used for DWDM applications provide values of $A_{min}$ that are greater than $A_{max}$, by a factor of 100 or more. The symmetry of the passbands and the large value of $A_{min}$ relative to $A_{max}$ maintain the constant proportionality between the phase-shift error, $\phi_{SE}$, and the difference between the optical power of the filtered signals, $P_{1A}$, $P_{2A}$, $P_{2B}$, and $P_{1B}$.

Clearly, the slopes of the passbands that filter the left and right-justified signals are not constant. However, the gradually increasing slope on one side of the stopbands compensates for the gradually decreasing slope on the other side of the stopbands. The superposition of these two effects produces a constant slope between the differential optical power measurements and the phase-shift error. Thus, the sum of the left-justified signals at the outputs of both wavelength combiners 44 and 46 subtracted from the sum of the right-justified signals at the outputs of both wavelength combiners 44 and 46 provides a negative feedback control signal to automatically adjust the passbands of the second wavelength combiner 46 by 180° relative to the passbands of the first wavelength combiner 44.

Figure 8:
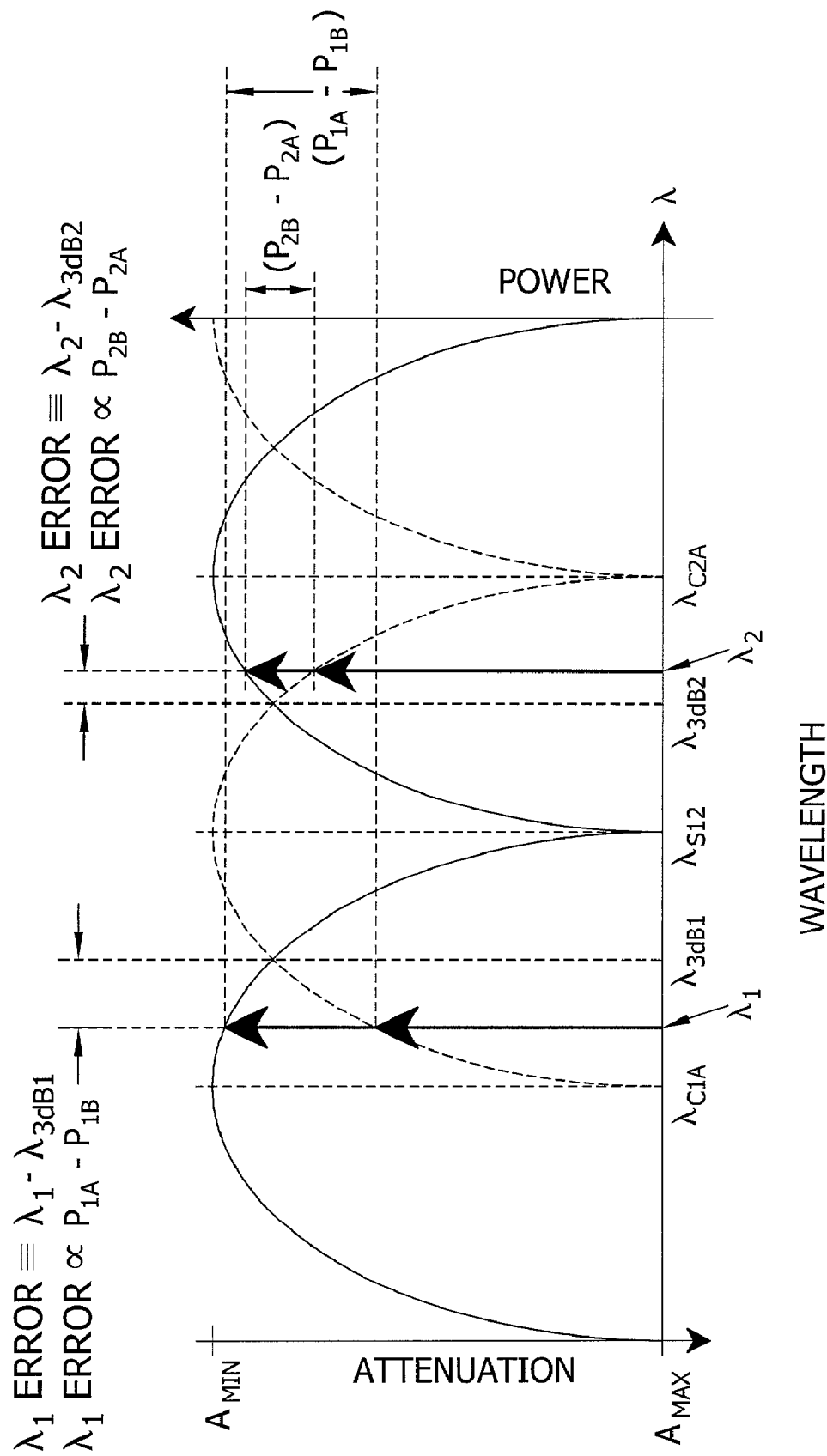
FIG. 8 is a graph illustrating two optical signals whose wavelengths are not optimally positioned relative to the passbands of a 2:1 wavelength combiner.

After the passbands of the second wavelength combiner 46 have been shifted by 180° relative to the first wavelength combiner 44, the second and final phase of the alignment process is applied. As mentioned earlier, an optimum location for the right and left-justified signals is halfway between the center of each passband and the stopband that separates the channels. For a Gaussian or cosine passband characteristic, this halfway point corresponds to attenuation that is substantially equal to 3 dB below the minimum attenuation point at the center of each passband. These 3 dB wavelengths are depicted as $\lambda_{3dB1}$, and $\lambda_{3dB2}$, in the graph of FIG. 8. As long as the carrier wavelength of the right-justified signal, $\lambda_1$, is located anywhere between the center of the passband, $\lambda_{C1A}$, and the stopband, $\lambda_{S12A}$, then the difference in the average power, $P_{1A}$, associated with the right-justified signal measured at the output of the first wavelength combiner 44, and the average power, $P_{1B}$, associated with the right-justified signal measured at the output of the second wavelength combiner 46 will indicate both the sign and magnitude of the error between the wavelength of the right-justified signal, $\lambda_1$, and the desired 3 dB wavelength for this channel, $\lambda_{3dB1}$.

Similarly, as long as the carrier wavelength of the left-justified signal, $\lambda_2$, is located anywhere between the center of the passband, $\lambda_{C2A}$, and the stopband, $\lambda_{S12A}$, then the difference in the average power, $P_{2A}$, associated with the left-justified signal measured at the output of the first wavelength combiner 44, and the average power, $P_{2B}$, associated with the left-justified signal measured at the output of the second wavelength combiner 46 will indicate both the sign and magnitude of the error between the wavelength of the left-justified signal, $\lambda_2$, and the desired 3 dB wavelength for this channel, $\lambda_{3dB2}$. Thus, measuring the difference between $P_{1A}$ and $P_{1B}$ provides a control to automatically and precisely locate $\lambda_1$ at the desired 3 dB wavelength, $\lambda_{3dB1}$. Similarly, measuring the difference between $P_{2A}$ and $P_{2B}$ provides a control to automatically and precisely locate $\lambda_2$ at the desired 3 dB wavelength, $\lambda_{3dB2}$.

These relationships can be described mathematically, by first defining a few additional terms. Let $\lambda_{PE1}$ equal the wavelength position error between the actual carrier wavelength of the right-justified signal, $\lambda_1$, and the desired 3 dB wavelength, $\lambda_{3dB1}$. Similarly, let $\lambda_{PE2}$ equal the wavelength position error between the actual carrier wavelength of the left-justified signal, $\lambda_2$, and the desired 3 dB wavelength, $\lambda_{3dB2}$. Thus mathematically, $$\lambda_{PE1} \equiv \lambda_{3dB1} - \lambda_1, \text{ and } \lambda_{PE2} \equiv \lambda_{3dB2} - \lambda_2. \tag{8}$$

Using these definitions with those that preceded them, the relationship between $\lambda_{PE1}$, $P_{1A}$ and $P_{1B}$ can be described mathematically as:

$$\lambda_{PE1} = [\lambda_{spacing}/(4P_{nom}A_{min})](P_{1A} - P_{1B}). \tag{9}$$

Similarly, the relationship between $\lambda_{PE2}$, $P_{2A}$ and $P_{2B}$ can be described mathematically as:

$$\lambda_{PE2} = [\lambda_{spacing}/(4P_{nom}A_{min})](P_{2B} - P_{2A}). \tag{10}$$

Comparing these equations with the expression for $\phi_{SE}$ shows that they are very similar. Furthermore, the assumptions and constraints associated with the expression for $\phi_{SE}$ are very similar to the assumptions and constraints for $\lambda_{PE1}$ and $\lambda_{PE2}$. In order for the equations (9, 10) describing $\lambda_{PE1}$ and $\lambda_{PE2}$ to be accurate, the difference between the carrier wavelengths, $\lambda_1$, $\lambda_2$, and their respective 3 dB wavelengths, $\lambda_{3dB1}$ and $\lambda_{3dB2}$, must be less than $\lambda_{spacing}$. As with the other equations, the passband characteristics must be mirror-imaged on either side of the stopbands, $\lambda_{S12A}$ and $\lambda_{S12B}$. Also, the value of $A_{min}$ must be substantially greater than $A_{max}$.

Figure 9:
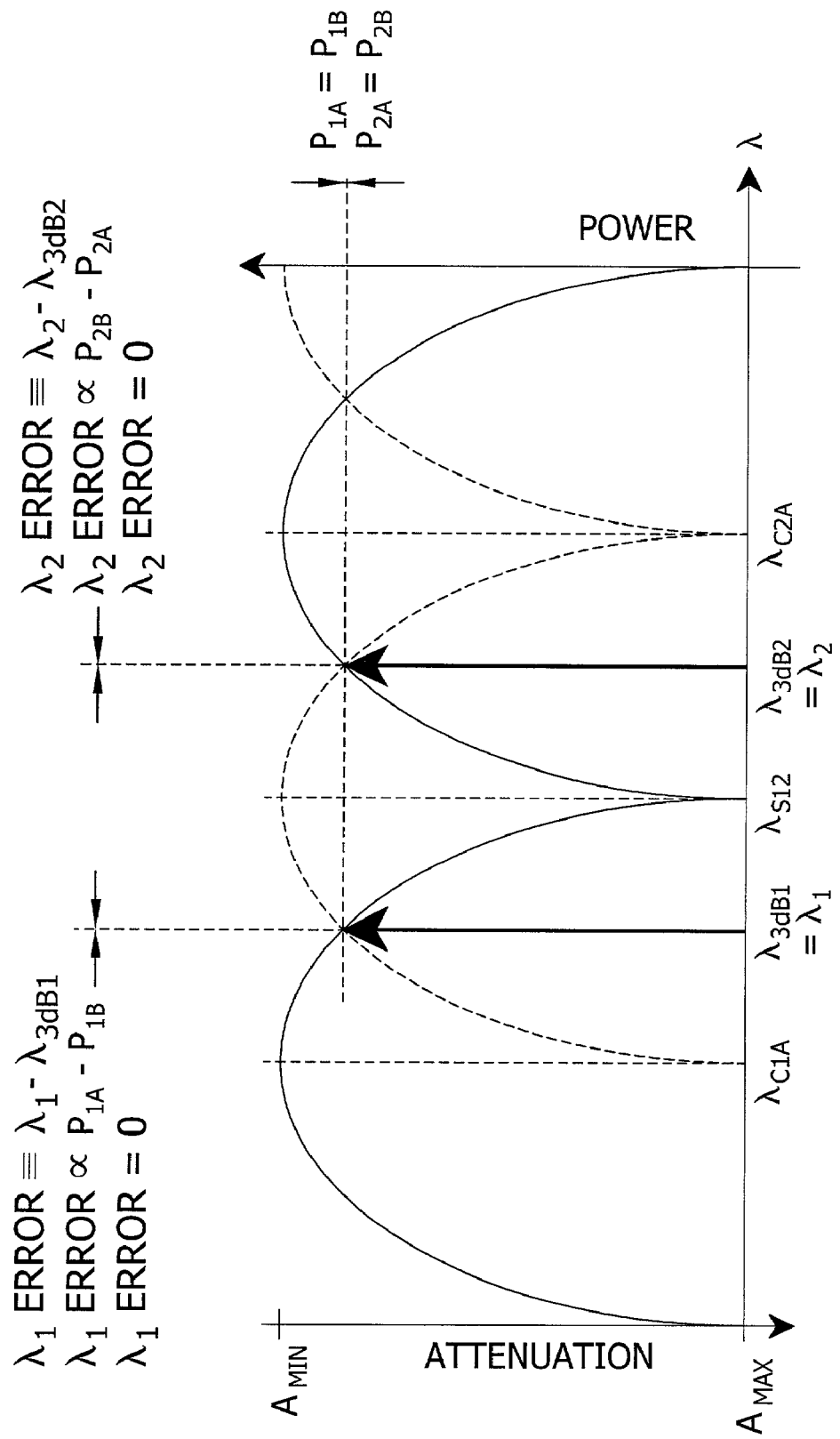
FIG. 9 is a graph illustrating two optical signals whose wavelengths are optimally positioned relative to the passbands of a wavelength combiner.

FIG. 9 is a graph illustrating the final positions of the left and right-justified signals at the end of the second and final stage of the alignment process. As indicated in FIG. 9, the 3 dB wavelengths, $\lambda_{3dB1}$ and $\lambda_{3dB2}$, correspond to the intersections of the passbands of the first wavelength combiner 44 and the passbands of the phase-shifted wavelength combiner 46. At these points of intersection, the measured optical output power for the right-justified signal from the first wavelength combiner 44, is substantially equal to the measured optical output power for the right-justified signal from the second wavelength combiner 46. At the next point of intersection, the measured optical output power for the left-justified signal from the first wavelength combiner 44, is substantially equal to the measured optical output power for the left-justified signal from the second wavelength combiner 46. These intersection points provide an optimal location for the right and left-justified wavelengths for effective suppression of the unwanted sidebands.

Thus, the pairing of the carrier wavelengths into right and left-justified signals enables the first stage of the alignment process to proceed automatically using differential power measurements between the right and left-justified signals at the outputs of wavelength combiner 44 and wavelength combiner 46. Completion of the first stage of the alignment process enables the second and final stage to proceed automatically using similar differential power measurements between the signals emerging at the outputs of the first wavelength combiner 44 and the second wavelength combiner 46. The second and final stage actually adjusts the carrier wavelengths to their optimal values.

It will be understood by those skilled in the art that the implementation of the first stage of the alignment process is not necessary if the wavelength combiners 44 and 46 can be manufactured with sufficient accuracy and stability so as to have their passbands shifted 180° relative to each other without the need for dynamic adjustment. In these embodiments of the present invention, the first stage of the alignment process is deleted. Assuming an initially accurate 180° shift, the pairing of the carrier wavelengths into right and left-justified signals permits the second to occur automatically using the methods previously described. Elimination of the first alignment stage simplifies the control circuits and/or program instructions needed to implement them. Furthermore, the elimination of the first alignment stage also eliminates the need for tuning the passband locations of the first and second wavelength combiners 44 and 46 leading to a savings in cost and an improvement in the reliability of the first and second wavelength combiners 44 and 46. Furthermore, it will be understood by those skilled in the art that all right or all left justified transmission, or any combination of the two, may be realized where dynamic control of the wavelength combiner is not necessary or is achieved using an alternative scheme.

Referring again to FIG. 4, the error signals, needed to implement the alignment method just described, are generated by measuring the optical power from wavelength combiners 44 and 46. A portion of the optical signals generated by wavelength combiner 44 is applied to a PIN diode 60 from splitter 52. The output of PIN diode 60 is applied to an analog/digital converter 62. The output of wavelength combiner 46 is applied to a PIN diode 64 whose output is applied to an analog/digital converter 66. The output of analog/digital converters 62 and 66 are applied to digital filters and control circuit 68. Circuit 68 uses the dither signals impressed upon lasers 12 and 14 to determine the average optical power associated with each channel emerging from wavelength combiners 44 and 46. The output of control circuit 68 is used to regulate the temperature of wavelength combiners 44 and 46 by applying an error correction signal to thermoelectric coolers 48 and 50. The output of control circuit 68 is also used to regulate the temperature of lasers 12 and 14, independently and automatically by applying an error correction signal to thermoelectric coolers 16 and 18. The temperature regulation of lasers 12 and 14 controls the central carrier wavelengths of lasers 12 and 14. The temperature regulation of wavelength combiners 44 and 46 control the phase difference between their wavelength responses.

Figure 10:
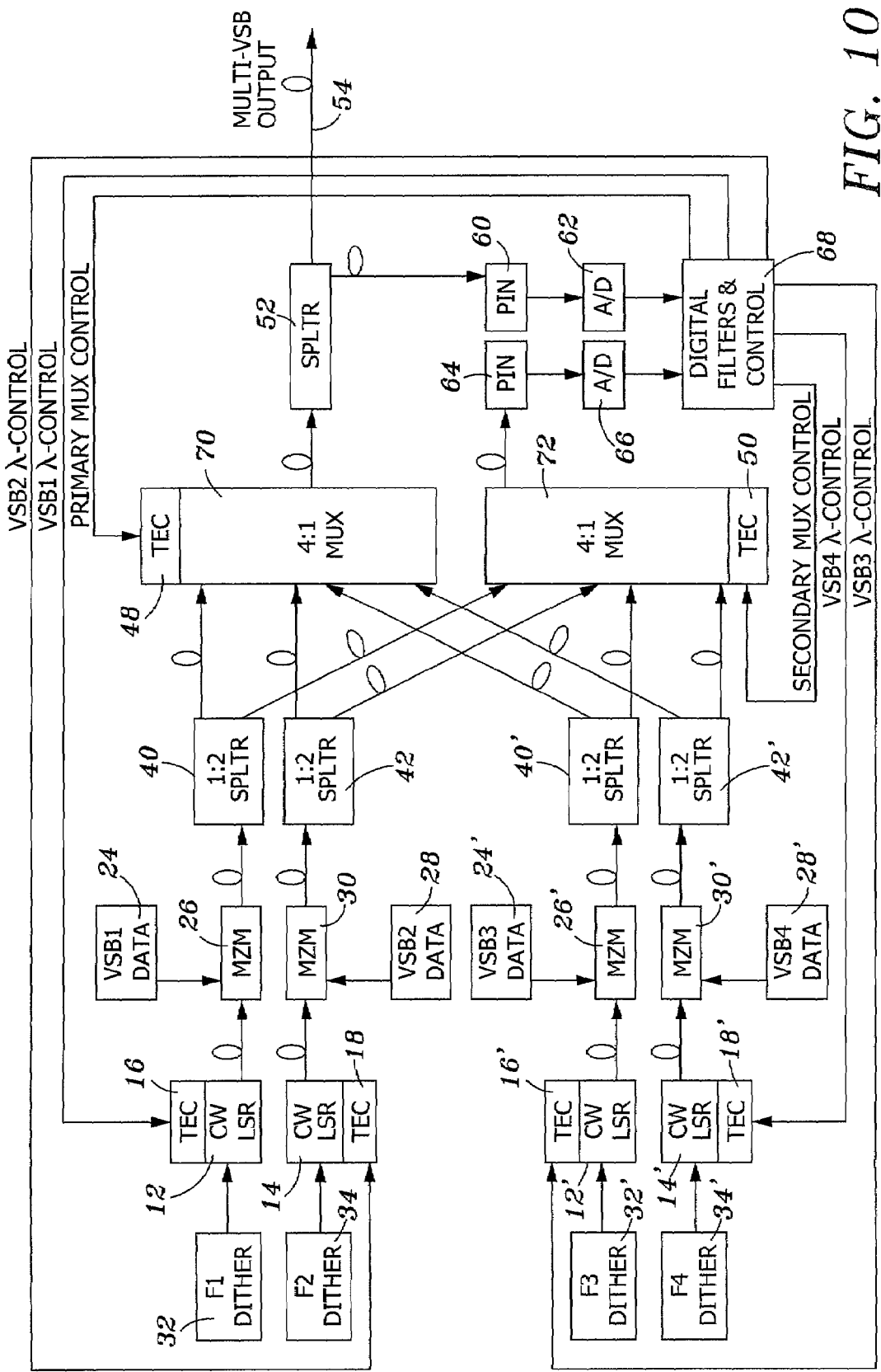
FIG. 10 is a block diagram of the present vestigial sideband transmitter in a four-channel embodiment utilizing 4:1 wavelength combiners.

Although transmitter 10 and the associated alignment method have been described in terms of two channels, transmitter 10 can be expanded to multiple channels utilizing multiple modulated laser sources driving multiple splitters and N:1 wavelength combiners. FIG. 10 is a block diagram illustrating such an embodiment with four channels. Like numerals are utilized for like and corresponding components previously identified with respect to FIG. 4. A prime (') designation refers to the additional channels. 4:1 multiplexers 70 and 72 replace 2:1 multiplexers 44 and 46. Consistent with the two-channel embodiment, each intensity-modulated source is dithered with a unique dither frequency so that their individual power levels may be determined at the outputs of the wavelength combiners 70 and 72. Fundamentally, the operation of the four channel embodiment is the same as the two channel embodiment (FIG. 4) and the invention can be scaled to arbitrary values of N beyond simply two or four channels as described herein as long as N is an even integer.

Figure 11:
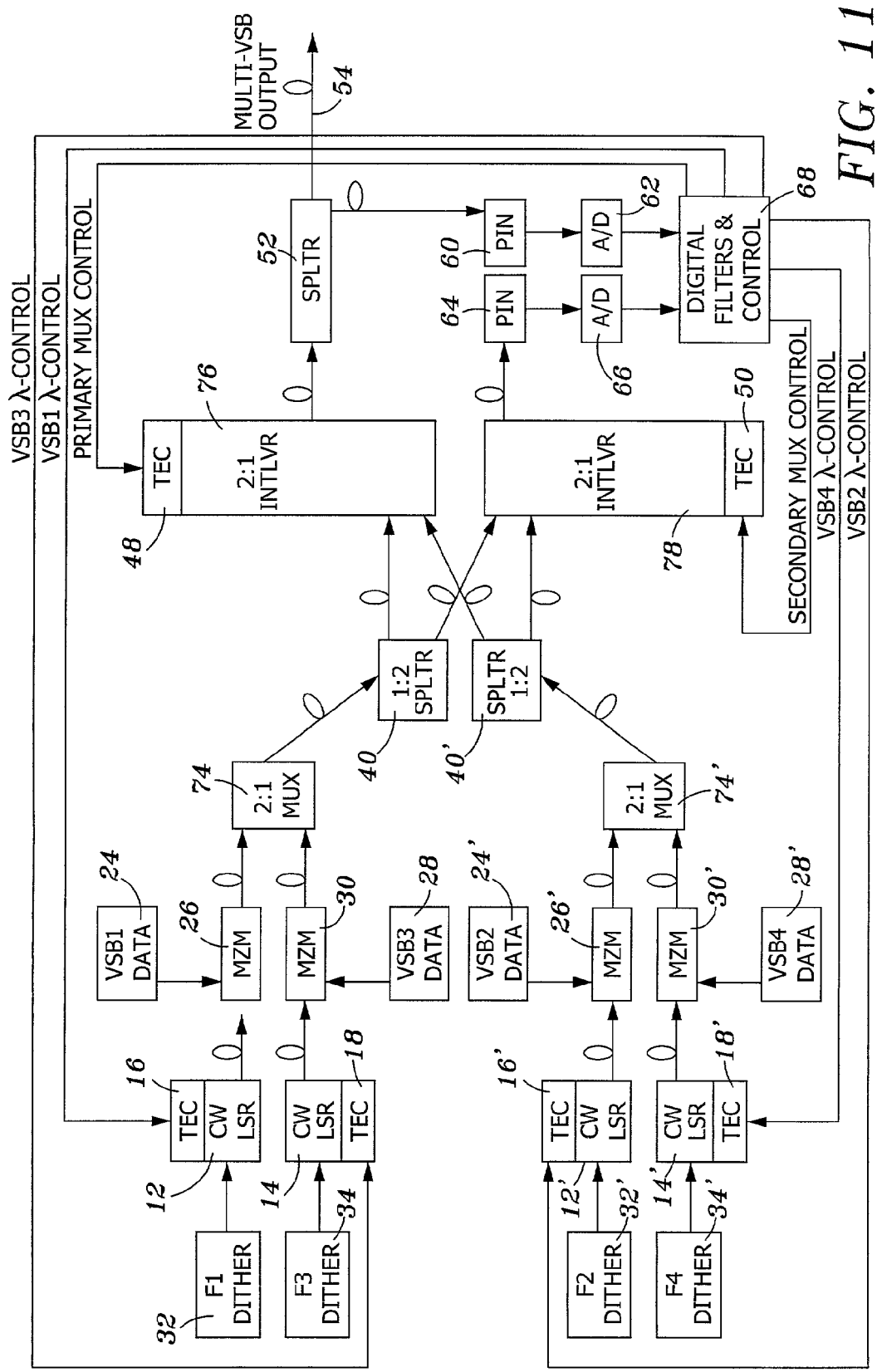
FIG. 11 is a block diagram of the present vestigial sideband transmitter in a four-channel embodiment utilizing 2:1 wavelength interleavers.

FIG. 11 is a block diagram illustrating a combination of N:1 wavelength multiplexers and 2:1 wavelength interleavers used in further embodiments of the present invention. Like numerals are utilized for like and corresponding components previously identified with respect to FIG. 10. FIG. 11 shows four VSB signal sources combined by a pair of 2:1 intermediate wavelength multiplexers 74, 74' followed by a pair of 2:1 wavelength interleavers 76 and 78. Because an N:1 interleaver has two fiber inputs, the N modulated signals initially enter two sets of intermediate optical multiplexers which combine the right-justified and left-justified channels into a pair of fibers connected to the interleaver inputs.

In embodiments such as shown in FIG. 11, the 2:1 intermediate multiplexers 74, 74' can each exhibit a channel spacing that is twice that of the 2:1 interleavers 76 and 78 and therefore do not appreciably filter the modulated optical signals. Instead, the periodic passbands of the 2:1 interleavers 76 and 78 perform the filtering of the unwanted sidebands and also enable the precise alignment of the wavelengths of the CW laser sources 14, 16, 14' and 16' relative to the periodic passbands of the 2:1 interleavers 76 and 78. The control and positioning of the modulated wavelengths in this example are identical to the previous 4:1 embodiment (FIG. 10) and both are simple extensions of the two-channel embodiment previously described (FIG. 4). Although this embodiment (FIG. 11) using interleavers contains four channels, this embodiment can be generalized to arbitrary N channel counts beyond four channels simply by changing the intermediate wavelength combiners from 2:1 multiplexers to N:1 multiplexers and driving them with N number of intensity-modulated light sources where N is an even integer.

Modification of the two-stage alignment process to accommodate larger channel counts is straightforward. In the first stage, the passbands of the second wavelength combiner 46 (FIG. 4) are shifted 180° relative to the passbands of the first wavelength combiner 44. This stage of the alignment process is virtually identical to that utilized in the two-channel embodiment. Initially, the passbands of the second wavelength combiner 46 may have any phase relationship relative to the first wavelength combiner 44 as long as they are shifted by more than 0° but less than 360° relative to the stopbands of the first wavelength combiner 44. As with the two-channel embodiment (FIG. 4), one of the wavelength combiners provided in the four-channel embodiments must be arbitrarily selected as the reference to guide the shifting of the passbands of the other wavelength combiner by 180°. Again, the first wavelength combiner is selected as the reference simply to illustrate the method.

Figure 12:
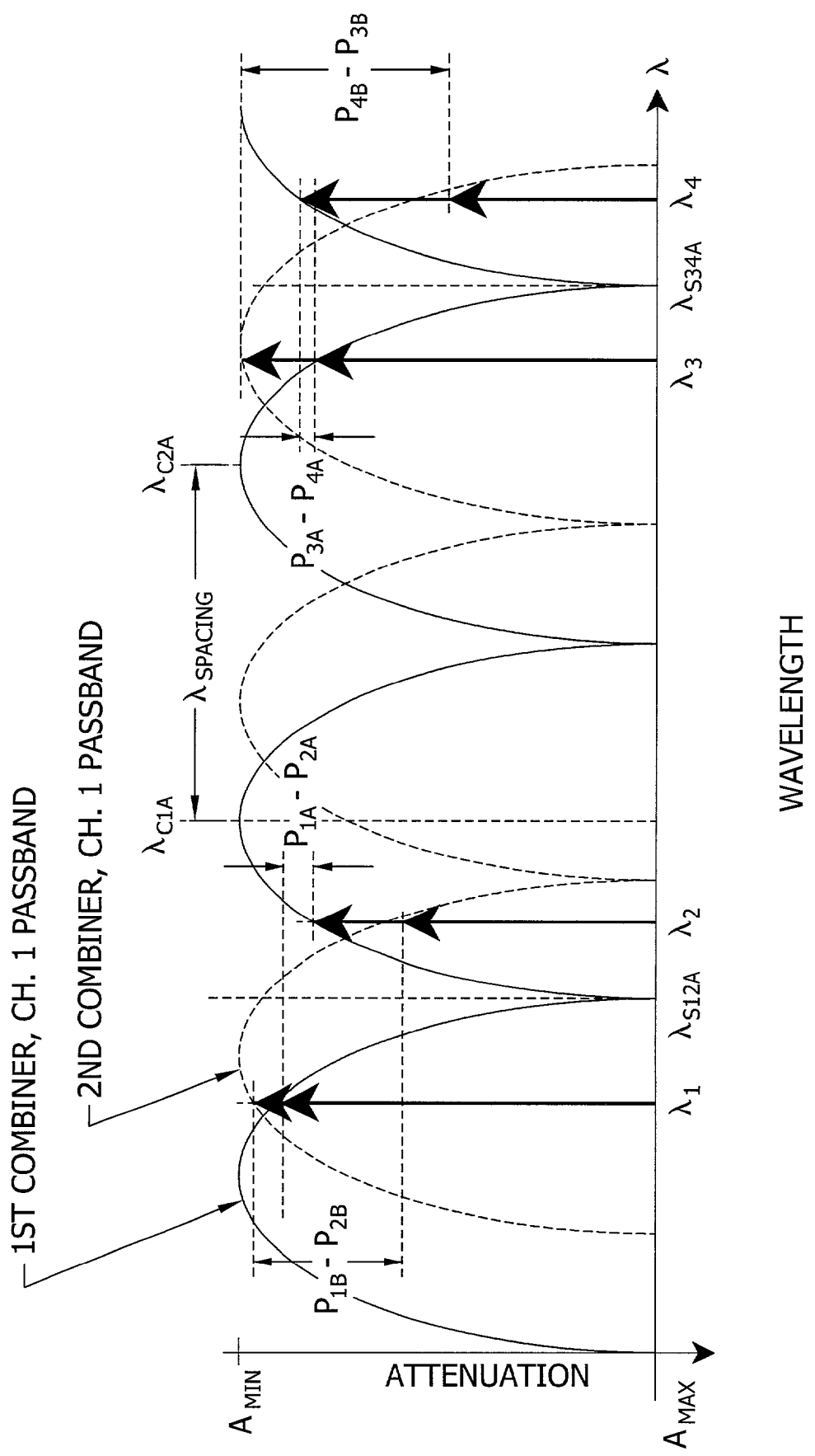
FIG. 12 is a graph illustrating the passbands of two 4:1 wavelength combiners in which one set of passbands are shifted less than 180° relative to the other set.

Consistent with the two-channel embodiments, the optical power measurements associated with the intensity-modulated carrier wavelengths are compared with each other to maintain a precise 180° shift between the passbands of the first and second wavelength combiners. FIG. 12 is a graph illustrating the condition in which the phase shift of the second wavelength combiner relative to the first is less than 180°. In FIG. 12, the dashed arcs depict the passbands of the second wavelength combiner, and the solid arcs depict the passbands of the first wavelength combiner for reference. Consistent with the two-channel embodiments, $\lambda_1$ and $\lambda_2$ are the carrier wavelengths associated with the first ordered pair of channels in which $\lambda_1$ is the right-justified signal and $\lambda_2$ is the left-justified signal. The stopband of the first wavelength combiner separating $\lambda_1$ and $\lambda_2$ is labeled $\lambda_{12A}$. Similarly, $\lambda_3$ and $\lambda_4$ are the carrier wavelength associated with the second ordered pair of channels in which $\lambda_3$ is the right-justified signal and $\lambda_4$ is the left-justified signal. The stopband of the first wavelength combiner separating $\lambda_3$ and $\lambda_4$ is labeled $\lambda_{S34A}$.

Just as $\lambda_1$ and $\lambda_2$ produced unique power levels, at the outputs of wavelength combiners 44 and 46 in the two-channel embodiments, the carrier wavelengths $\lambda_1$, $\lambda_2$, $\lambda_3$, and $\lambda_4$ produce unique power levels, $P_{1A}$, $P_{2A}$, $P_{3A}$, and $P_{4A}$ at the output of the first wavelength combiner 70 and $P_{1B}$, $P_{2B}$, $P_{3B}$, and $P_{4B}$ at the output of the second wavelength combiner 72 in the four-channel embodiments. Consistent with the two-channel embodiments, the difference between the right-justified signal power emerging from both wavelength combiners and the left-justified signal power emerging from both wavelength combiners indicates both the magnitude and sign of the phase-shift error.

The behavior of the four-channel embodiments can be described mathematically in terms that are very similar to the two-channel embodiments. In the two-channel embodiments, the phase-shift error, $\phi_{SE}$, between the first and second wavelength combiners 44 and 46 was defined mathematically as:

$$\phi_{SE}=180°-[360°/(\lambda_{C2}-\lambda_{C1})](\lambda_{S12B}-\lambda_{S12A}). \tag{2}$$

This definition for phase-shift error is also used for the four-channel embodiments because the phase shift between any single pair of stopbands implicitly defines the phase shift between all other pairs of stopbands regardless of the channel count. For example, a phase-shift error, $\phi_{SE}$, of 79° between $\lambda_{S12A}$ and $\lambda_{S12B}$ would also imply the same phase-shift difference between $\lambda_{S34A}$ and $\lambda_{S34B}$.

In the two-channel embodiments, the phase shift error was proportional to the difference between the right-justified signal power emerging from both wavelength combiners 44 and 46 and the left-justified signal power emerging from both wavelength combiners 44 and 46. This is also true in the four-channel embodiments. The mathematical expression for the phase-shift error in the four-channel embodiments simply takes into account the fact that there are two right-justified signals contributing the right-justified signal power and two left-justified signals contributing to the left-justified signal power emerging from each wavelength combiner. The contributions from each additional channel are simply summed with the original channels in the two-channel embodiments to yield the expression:

$$\phi_{SE}=[90°/(2P_{nom}A_{min})][(P_{1A}+P_{1B}+P_{3A}+P_{3B})-(P_{2A}+P_{2B}+P_{4A}+P_{4B})]. \tag{11}$$

Consistent with the two channel embodiment, the phase shift error is proportional to the sum of the left-justified signal power out of both wavelength combiners subtracted from the sum of the right-justified signal power out of both wavelength combiners.

Mathematically, the phase shift error for the N-channel embodiment, may be expressed as:

$$\phi_{SE} = 2[90°/(NP_{nom}A_{min})][(P_{1A} + P_{1B} + P_{3A} + P_{3B} + \ldots + P_{(N-1)A} + P_{(N-1)B}) - (P_{2A} + P_{2B} + P_{4A} + P_{4B} + \ldots + P_{NA} + P_{NB})]. \quad (12)$$

This generalized equation correctly implies that the phase-shift error is indicated by the sum of all left-justified signal powers subtracted from the sum of all right-justified signal powers out of both wavelength combiners averaged over the total number of ordered pairs. Implicitly, the total number of ordered pairs is equal to half of the total channel count. All of the constraints required by the equations describing two-channel embodiments also apply to the equations describing $\phi_{SE}$ for the four-channel embodiments and the N-channel embodiments. As with the two-channel embodiments, the equations are substantially accurate only for $\phi_{SE}$ between −180° and +180°. As with the two channel embodiments, the difference measurements are applied to a control regulating the phase shift of the second wavelength combiner relative to the first wavelength combiner depicted in FIGS. 5 and 6.

Figure 13:
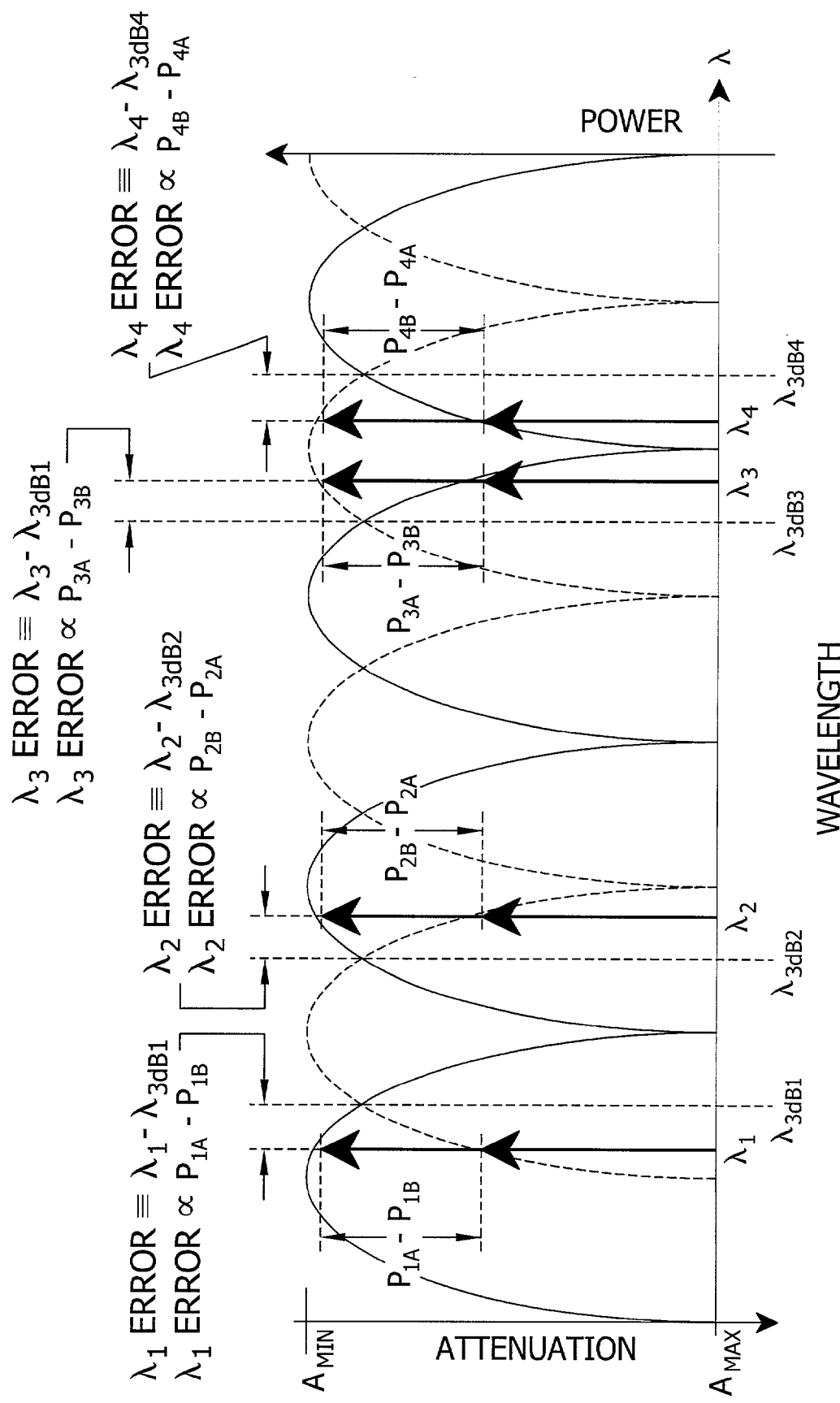
FIG. 13 is a graph illustrating four optical signals whose wavelengths are not optimally positioned relative to the passbands of a 4:1 wavelength combiner.

After both wavelength combiners depicted in either FIG. 10 or FIG. 11 have been shifted 180° with respect to each other, the second stage of the alignment process may occur. Consistent with the two channel embodiments, the wavelengths of the intensity modulated signals in the four channel embodiments are aligned independently of each other by means of their respective power measurements. FIG. 13 is a graph illustrating the relationship between the carrier wavelengths and their respective power measurements. The behavior of the first two channels, $\lambda_1$ and $\lambda_2$, are identical to the two-channel embodiments. The wavelength position error of the first channel and the second channel are defined as:

$$\lambda_{PE1} = \lambda_{3dB1} - \lambda_1, \text{ and } \lambda_{PE2} = \lambda_{3dB2} - \lambda_2, \text{ respectively} \quad (13).$$

By defining $\lambda_{3dB3}$ and $\lambda_{3dB4}$ as the optimal 3 dB wavelength positions for the third and fourth channels, the wavelength position error for the third and fourth channels may be defined as:

$$\lambda_{PE3} = \lambda_{3dB3} - \lambda_3, \text{ and } \lambda_{PE4} = \lambda_{3dB4} - \lambda_4, \text{ respectively} \quad (14).$$

Identical to the two channel embodiments, the carrier wavelengths of the first two channels are controlled by the following wavelength position error measurements:

$$\lambda_{PE1} = [\lambda_{spacing}/(4P_{nom}A_{min})](P_{1A} - P_{1B}), \quad (9) \text{ and}$$

$$\lambda_{PE2} = [\lambda_{spacing}/(4P_{nom}A_{min})](P_{2A} - P_{2B}). \quad (10)$$

Similarly, the carrier wavelengths of the third and fourth channels are controlled by the following wavelength position error measurements:

$$\lambda_{PE3} = [\lambda_{spacing}/(4P_{nom}A_{min})](P_{3A} - P_{3B}), \quad (15) \text{ and}$$

$$\lambda_{PE4} = [\lambda_{spacing}/(4P_{nom}A_{min})](P_{4A} - P_{4B}), \text{ respectively}. \quad (16)$$

In an N-channel embodiment, the carrier wavelength of the Nth laser is controlled by:

$$\lambda_{PEN} = [\lambda_{spacing}/(4P_{nom}A_{min})](P_{NA} - P_{NB}). \quad (17)$$

The constraints required for the four-channel and N-channel equations to be accurate are the same as those required in the two-channel embodiments.

It will be understood by those skilled in the art that the alignment stages need not necessarily be implemented in a sequential manner. They have been described sequentially to simplify the explanation. Whether or not analog hardware, digital hardware, a computer program or a DSP program is used to implement the alignment, all three alignment phases may be applied without regard to sequence or even simultaneously as long as the settling time of the first alignment stage is significantly faster than the settling time of the second alignment phase. It will be understood by those skilled in the art that the freedom to perform all both stages simultaneously with independent control loops has the advantage of simplifying the control design.

Figure 14:
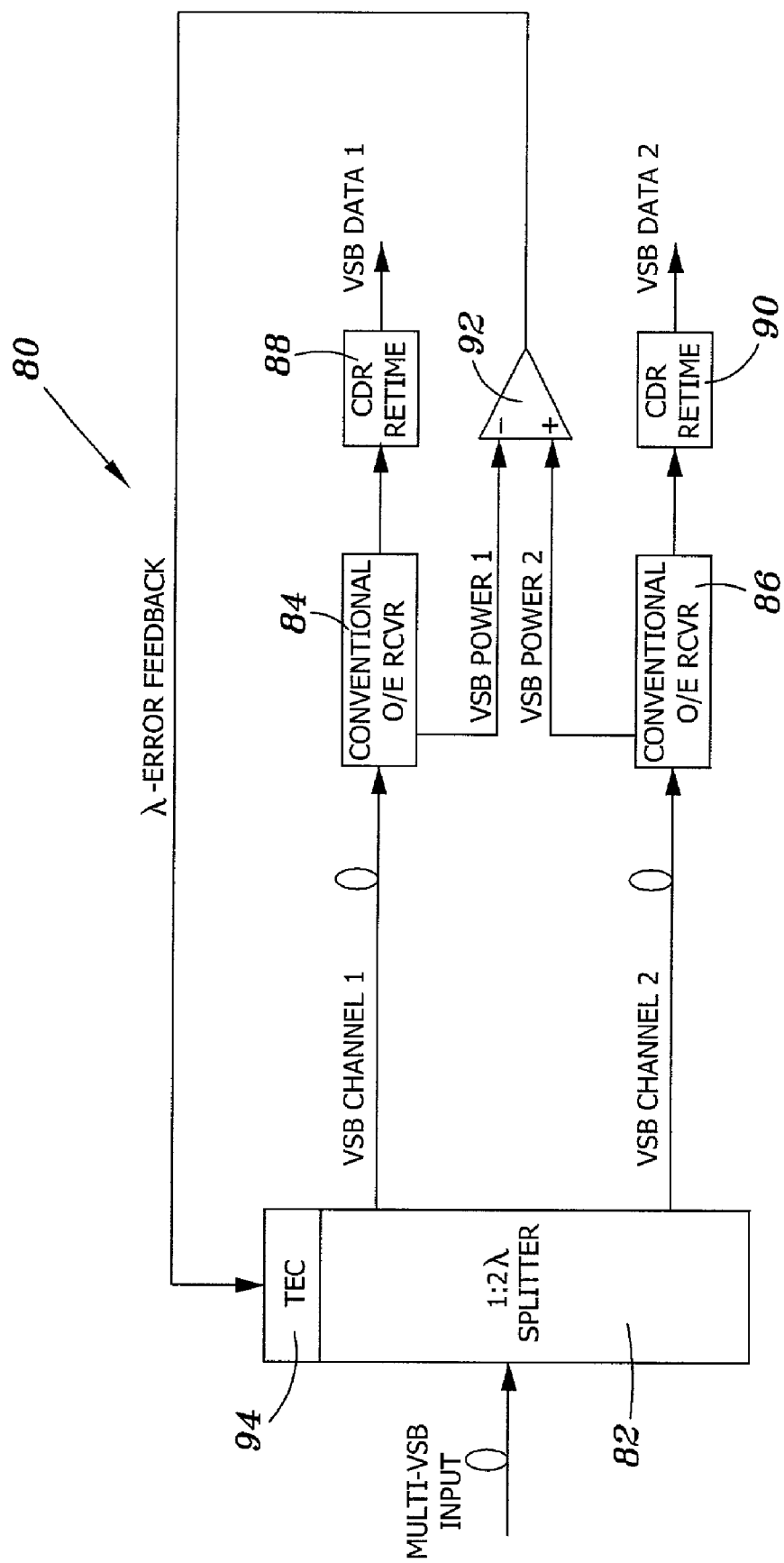
FIG. 14 is a block diagram of the present vestigial sideband receiver in the two-channel embodiment.

FIG. 14 illustrates a receiver, generally identified by the numeral 80, in accordance with the present invention. Receiver 80 includes a complementary 1:2 wavelength splitter 82 which receives the multiple vestigial sideband input signals. The outputs of wavelength splitter 82 provide individual vestigial sideband signals to conventional optical-to-electrical (O/E) receivers 84 and 86, respectively. Receivers 84 and 86 drive conventional clock/data recovery circuits 88 and 90, respectively. Wavelength splitter 82 demultiplexes the first and second vestigial sideband signals and provides them to receivers 84 and 86. Wavelength splitter 82 also provides additional filtering of the unwanted spectrum from each vestigial sideband signal.

Each receiver 84 and 86 detects the average optical power at its input and applies that measurement to a differential control circuit 92 that generates an error signal. The error signal is applied to a thermoelectric cooler 94 of wavelength splitter 82 that aligns the stopband of wavelength splitter 82 between the upper and lower vestigial sideband signals. The optical power measurements at the inputs to receiver 84 and 86 are substantially equal when the stopband wavelength splitter 82 is centered between the vestigial sideband signals. Once centered between the right and left-justified signals, the wavelength splitter 82 provides the right-justified signal to the upper receiver 84, and the left-justified signal to the lower receiver 86. In addition to separating the VSB signals onto separate light paths for the separate receivers, the wavelength splitter also performs additional filtering to further suppress the unwanted sideband from each signal.

Figure 15:
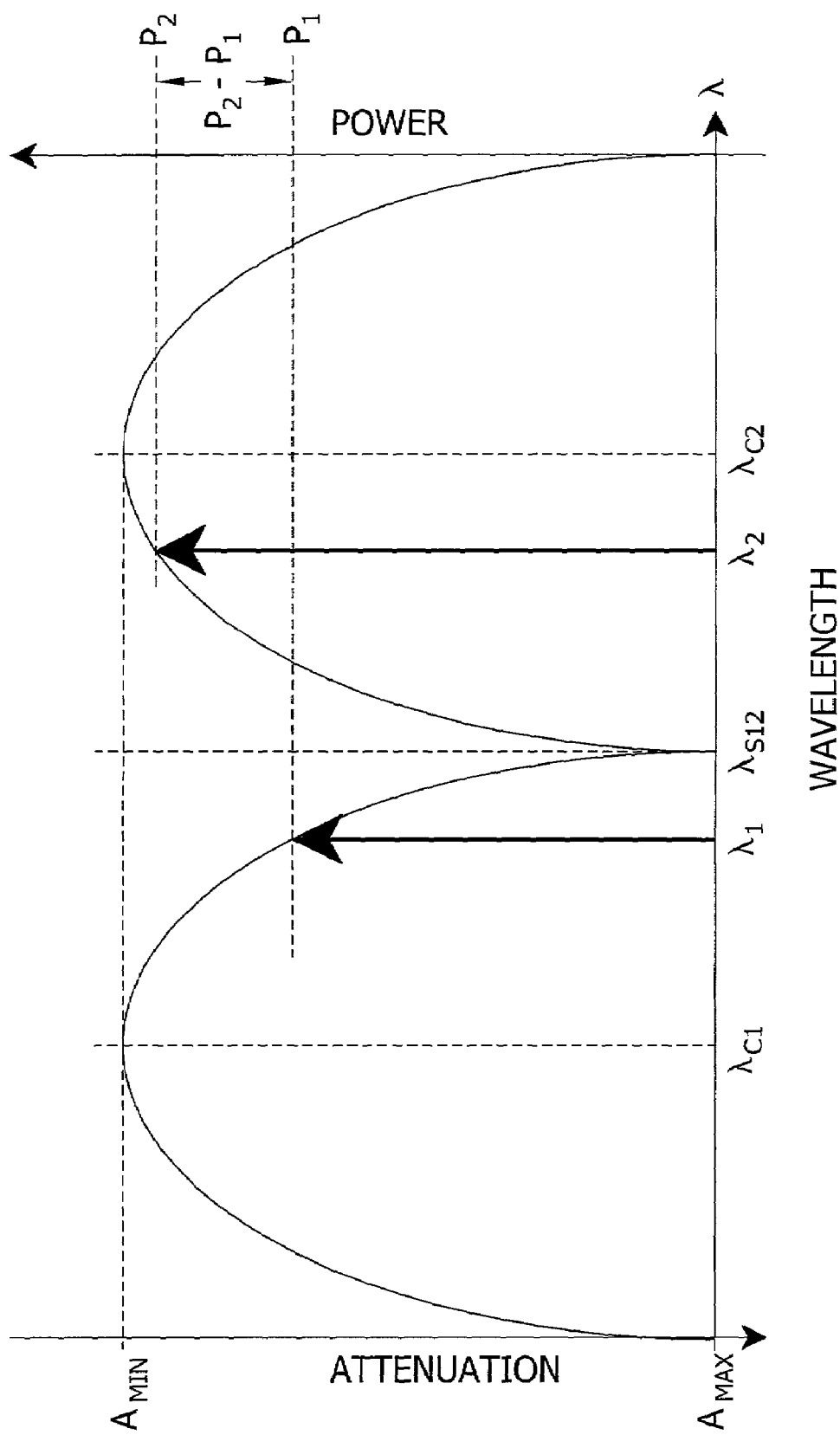
FIG. 15 is a graph illustrating the passbands of a 1:2 wavelength splitter, which are not centered between the received right-justified and left-justified VSB signals.

FIG. 15 is a graph illustrating the relationship between the passbands of wavelength splitter 82 and the vestigial sideband signals driving the input. Consistent with the transmitter, the first arc in FIG. 15 represents the passband characteristics of the first output from wavelength splitter 82. Likewise, the second arc represents the passband characteristics of the second output from wavelength splitter 82. The first vertical arrow represents the right-justified signal with carrier wavelength, $\lambda_1$, and the second vertical arrow represents the left-justified signal with carrier wavelength, $\lambda_2$. These signals are filtered by the passbands of wavelength splitter 82 and produce optical power measurements at the outputs of wavelength splitter 82 equal to $P_1$ and $P_2$ respectively. The center of the passband for the first output from the wavelength splitter is labeled $\lambda_{C1}$. The center of the passband for the second output from the wavelength splitter is labeled $\lambda_{C2}$. The stopband separating the passbands of the two outputs is labeled $\lambda_{S112}$.

Figure 16:
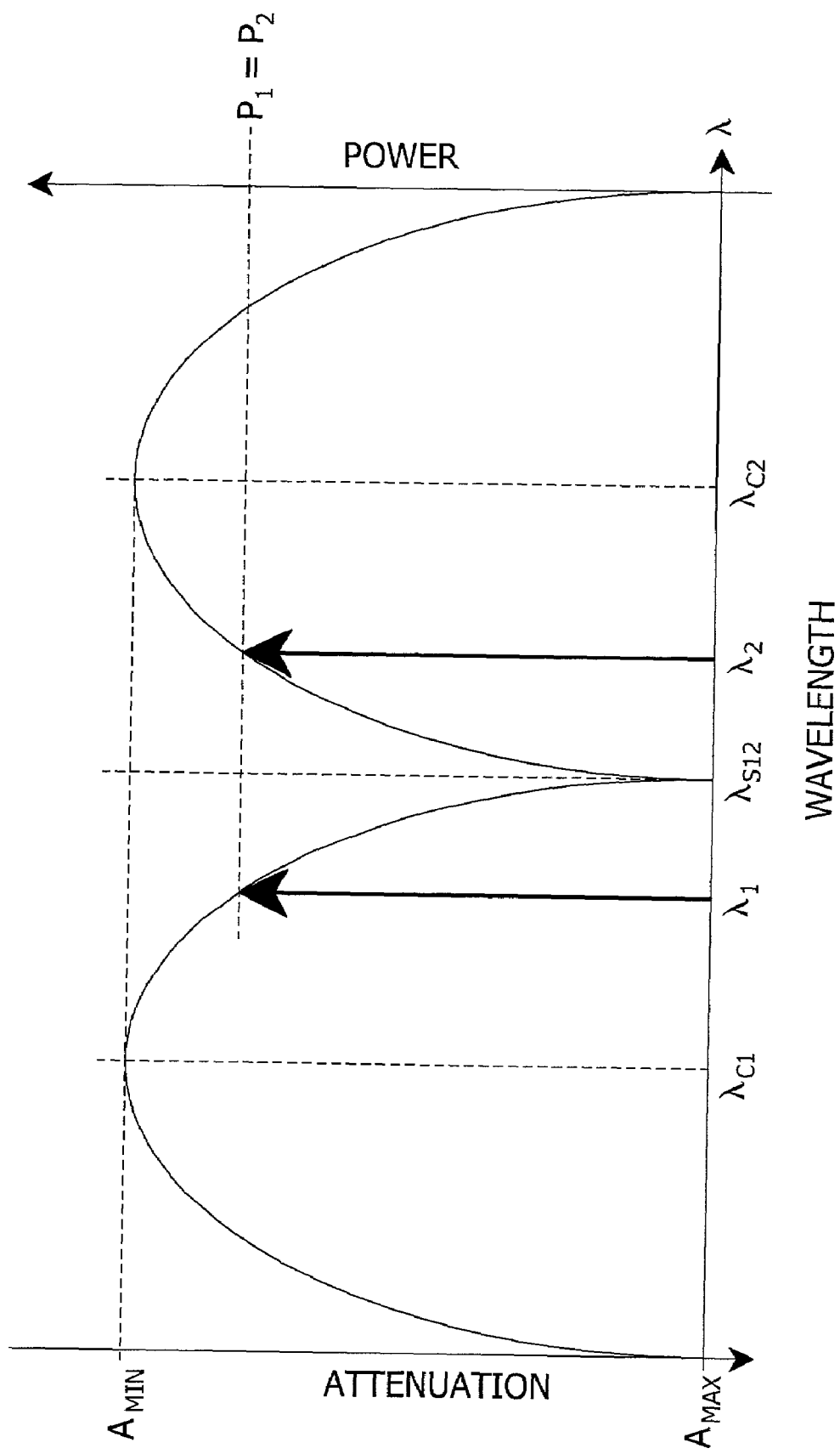
FIG. 16 is a graph illustrating the passbands of a 1:2 wavelength splitter, which are centered between the received right-justified and left-justified VSB signals.

If the stopband, $\lambda_{S12}$, is not centered between $\lambda_1$ and $\lambda_2$, then the difference between the average optical power measured at the first output of wavelength splitter 82 and the second output will indicate both the sign and the magnitude of the centering error. An example of this is indicated in FIG. 15 as $P_2-P_1$. FIG. 16 is a graph illustrating the desired condition in which the stopband, $\lambda_{S12}$, is substantially centered between $\lambda_1$ and $\lambda_2$. Here, the optical power measurements associated with each signal at their respective outputs from wavelength splitter 82 are substantially equal.

The relationship between the differential power measurements provided by the receivers 84 and 86 and the centering error of the wavelength splitter 82 between the left and right-justified can be expressed mathematically by defining a few terms. Let $\lambda_{CE}$ equal the centering error of the wavelength splitter relative to the right and left-justified signals entering the splitter. Let $P_{nom}$ equal the average optical power associated with each justified signal entering wavelength splitter 82. Let $P_1$ equal the optical power associated with the right-justified signal measured at the output of wavelength splitter 82. Let $P_2$ equal the optical power associated with the left-justified signal measured at the output of wavelength splitter 82.

With these definitions, the centering error may be defined mathematically as, $$\lambda_{CE} \equiv (\lambda_2 - \lambda_{S12}) - (\lambda_{S12} - \lambda_1). \tag{18}$$

Accordingly, the following equation describes the relationship between the measured optical power of the right and left-justified signals at the output of wavelength splitter 82 and the centering error:

$$\lambda_{CE} = [\lambda_{spacing}/(4P_{nom}A_{min})](P_2-P_1). \tag{19}$$

This equation correctly implies that the centering error is directly proportional to the difference in the optical power measurements of the right and left-justified signals after they have been filtered by wavelength splitter 82.

In order for this equation (19) to be substantially accurate, the initial difference between the carrier wavelength of the right justified signal, $\lambda_1$, and the left justified signal, $\lambda_2$, must be less than $\lambda_{spacing}$. Also, the shape of the passbands on either side of $\lambda_{S12}$ must be symmetrical. Passbands described by Gaussian transfer functions or by cosine transfer functions are examples of wavelength splitters familiar to those skilled in the art that exhibit this symmetry. Furthermore the value of $A_{min}$ must be substantially greater than $A_{max}$. Those skilled in the art will be aware that most wavelength splitter technologies used for DWDM applications provide values of $A_{min}$ that are greater than $A_{max}$ by a factor of 100 or more. The symmetry of the passbands and the large value of $A_{min}$ relative to $A_{max}$ maintain the constant proportionality between the centering error, $X_{RCE12}$, and the difference between the optical power of the filtered signals, $P_2$, and $P_1$. Thus, the difference in the measured optical power of the right and left-justified signals at the output of wavelength splitter 82 provides regulation of the position of the stopband of the wavelength splitter 82 relative to the right and left-justified signals.

Other measurement methods for centering the wavelength splitter are possible utilizing, for example, BER detected on the data outputs as well as Q-factor measured at the input to each clock/data recovery circuit 88 and 90. The measured BER would be equal when the wavelength splitter 82 is centered between the vestigial sideband signals. Similarly, the measured Q-factors would be equal when wavelength splitter 82 is centered between the vestigial sideband signals.

Figure 17:
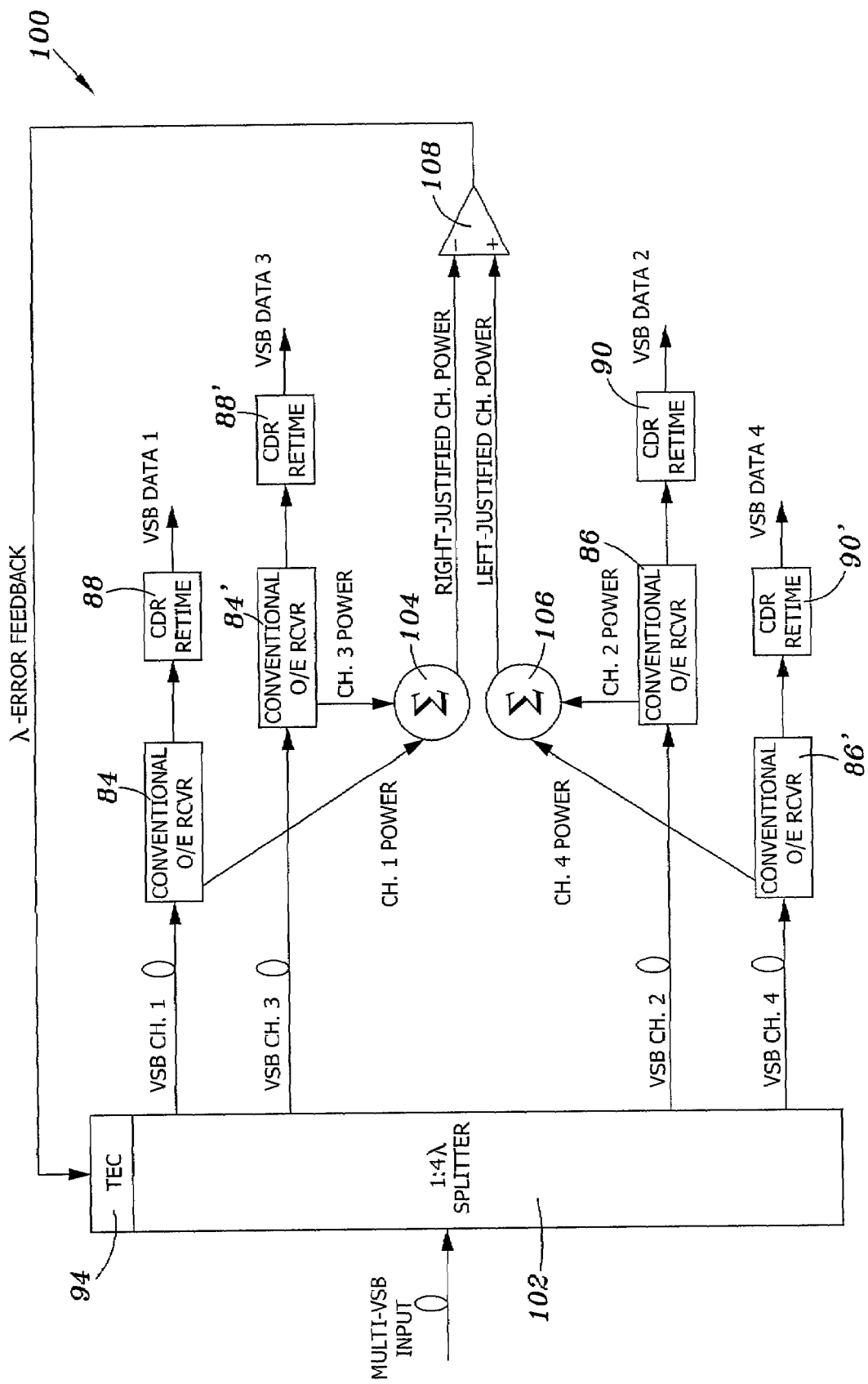
FIG. 17 is a block diagram of the present vestigial sideband receiver in a four-channel embodiment utilizing a 1:4 wavelength splitter.

Although receiver 80 has been described in terms of receiving two vestigial sideband signals, other embodiments of the present invention can receive an arbitrary number of vestigial sideband channels. FIG. 17 illustrates one such embodiment 100 in which four vestigial sideband signals are received wherein like numerals are used for like and corresponding components previously identified with respect to FIG. 14. A prime (') designation refers to the additional channels. In FIG. 17, multiple VSB input signals enter a 1:4 wavelength splitter 102 whose outputs drive four conventional O/E receivers 84, 84', 86, and 86'. The power measurements corresponding to the right-justified VSB signals are summed together at summation 104 and compared to the summed power measurements of the left-justified VSB signals summed together at summation 106 at circuit 108 to generate a control signal that regulates the position of the passbands of the 1:4 wavelength splitter. The edges of the passbands of the 1:4 wavelength splitter 102 will be centered between the right-justified signals and the left-justified signals when the summation of the average power measurements of the right-justified signals are substantially equal to the summation of the power measurements of the left-justified signals.

The embodiment of FIG. 17 can be extended to channel counts other than four by simply replacing the 1:4 wavelength splitter 102 with a 1:N wavelength splitter, and comparing the sum of the power measurements of the right-justified signals to the sum of the power measurements of the left-justified signals. As with the two channel embodiment, the wavelength splitter separates the VSB signals and provides additional filtering of the unwanted sidebands.

Consistent with the transmitter, the wavelength splitters in the receiver embodiments are not restricted to a particular technology and may utilize component technologies such as thin films, array waveguides, and others. Furthermore, the receiver embodiments may utilize a wavelength de-interleaver to initially separate the right-justified signals from the left-justified signals and to provide additional filtering of the unwanted sidebands. The receiver embodiment depicted in FIG. 14 utilizes a 1:2 wavelength splitter that could be implemented with a 1:2 de-interleaver according to and consistent with the principles of this invention.

Figure 18:
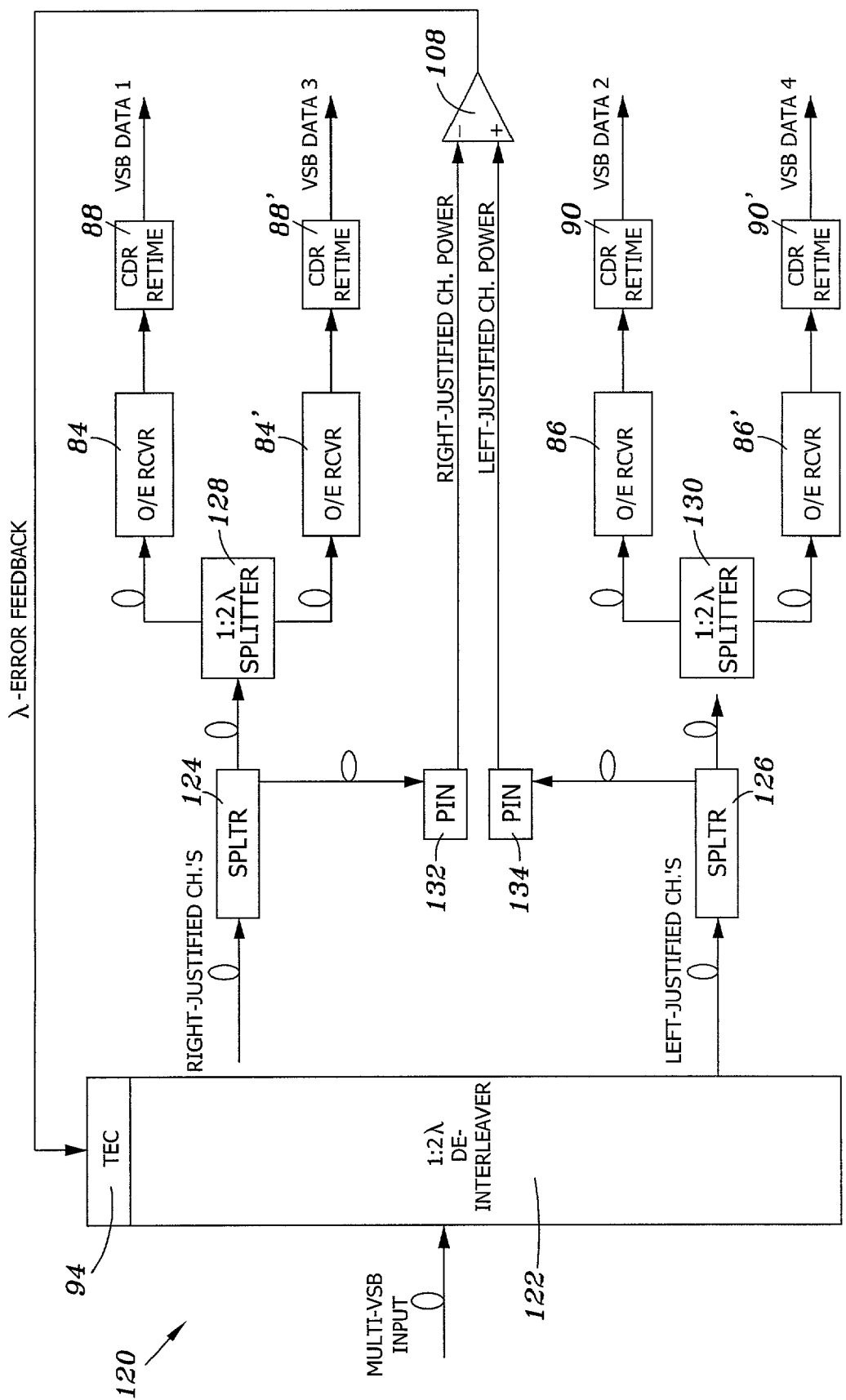
FIG. 18 is a block diagram of the present vestigial sideband receiver in a four-channel embodiment utilizing a 1:2 wavelength de-interleaver

FIG. 18 is a block diagram illustrating another embodiment of the present invention utilizing a 1:2 de-interleaver in a four-channel implementation 120. The 1:2 de-interleaver 122 accepts a single optical input containing multiple VSB signals and separates them, sending the right-justified signals to one output, and the left-justified signals to a second output. In addition to separating the VSB signals, the periodic passband of the 1:2 de-interleaver 122 also provides filtering to suppress the unwanted sideband associated with each VSB signal. The right-justified signals from the 1:2 de-interleaver 122 enter a 1:2 wavelength splitter 128 which further separates the right-justified VSB signals, providing one VSB signal on each individual optical waveguide and provides these to conventional O/E receivers 84 and 84'. Similarly, the left-justified signals from the 1:2 de-interleaver 122 enter a second 1:2 wavelength splitter 130 which further separates the left-justified VSB signals, providing one VSB signal on each individual optical waveguide and provides these to conventional O/E receivers 86 and 86'. Because the 1:2 de-interleaver 122 provides the initial separation of the right-justified signals from the left-justified signals and also provides filtering of the unwanted sidebands, the subsequent 1:2 wavelength splitters 128 and 130 can have passbands that are twice as wide as those of the de-interleaver and can, therefore, use technology that is less expensive, simpler, and easier to manufacture.

As with the other embodiments, the embodiment of FIG. 18 can be easily generalized to larger channel counts. For example, the receiver depicted in FIG. 14 can be easily extended to 8 channels by simply changing the 1:2 wavelength splitters to 1:4 wavelength splitters. The 1:4 wavelength splitters would have passbands that are twice as wide as the periodic passbands in the 1:2 de-interleaver that feeds them. Although the power measurements obtainable from the conventional O/E receivers 84, 84', 86 and 86' could easily be combined to obtain a summation of the right-justified VSB signals and the left-justified VSB signals, they may also be obtained as shown in FIG. 18. A simple signal splitter 124 and 126, that is largely wavelength independent, provides a small fraction of the power from each output of the 1:2 de-interleaver 122 to a PIN detector 130 and 132, respectively. The outputs of these PIN detectors 128 and 130 provide a ready-made summation of the average power levels of the right-justified VSB signals and the left-justified VSB signals.

Consistent with the other embodiments, these summations from detectors 130 and 132 are compared to each other at circuit 108 to generate a control regulating the position of the periodic passbands of the 1:2 de-interleaver 122. As with the other embodiments, the edges of the periodic passbands of the 1:2 de-interleaver 122 will be centered between the right-justified VSB signals and the left-justified VSB signals when the average power measurement of the right-justified signals is largely equal to the average power measurement of the left-justified signals.

The equations describing two-channel receiver embodiments are easily generalized to N-channel embodiments. Define $\lambda_{CE}$ as the centering error of the stopbands of an N-channel wavelength splitter between the right and left-justified signals entering the splitter. Define $\lambda_{S12}$ as the stopband separating channels one and two of the N-channel splitter. Similarly, define $\lambda_{S34}$ as the stopband separating channels three and four of the N-channel splitter. Now, define $\lambda_{S(N-1)N}$ as the stopband separating channels (N−1) and N of the N-channel splitter. Let $\lambda_1$ equal the carrier wavelength of the first (right-justified) signal entering the N-channel splitter. Let $\lambda_2$ equal the carrier wavelength of the second (left-justified) signal entering the N-channel splitter. Similarly, let $\lambda_3$ and $\lambda_4$ equal the carrier wavelengths of the third (right-justified) signal and fourth (left-justified) signal entering the N-channel splitter. Let $\lambda_{(N-1)}$ and $\lambda_N$ equal the carrier wavelengths of the (N−1) (right-justified) signal and Nth (left-justified) signal entering the N-channel splitter. Consistent with the two-channel embodiment, let the average optical power measured at the output of the N-channel wavelength splitter for each channel equal $P_1$, $P_2$, $P_3$, $P_4$, ... $P_{(N-1)}$, $P_N$ for $\lambda_1$, $\lambda_2$, $\lambda_3$, $\lambda_4$ ... $\lambda_{(N-1)}$, $\lambda_N$, respectively. Let $P_{nom}$ equal the average optical power associated with each justified signal entering the N-channel wavelength splitter.

With these terms, the wavelength centering error for the N-channel embodiments can be defined mathematically as:

$$\lambda_{RCE} \equiv 2\{[(\lambda_2 - \lambda_{S12}) - (\lambda_{S12} - \lambda_1)] + \quad (20)$$
$$[(\lambda_4 - \lambda_{S34}) - (\lambda_{S34} - \lambda_3)] + \ldots +$$
$$[(\lambda_N - \lambda_{S(N-1)N}) - (\lambda_{S(N-1)N} - \lambda_{N-1})]\}/N.$$

Relative to the two-channel definition, this is a centering error that is averaged over all of the ordered pairs of signals located on either side of their respective stopbands. With these definitions, the relationship between the centering error and the filtered output power for the N-channel embodiment can be described as:

$$\lambda_{RCE} = 2[\lambda_{spacing}/(NP_{nom}A_{min})][(P_1 - P_2) + (P_3 - P_4) + \ldots + (P_{N-1} - P_N)]. \quad (21)$$

Consistent with the definition, this equation expresses the centering error as an average of the differential power measurements observed between all of the right and left-justified signals. Consistent with the two-channel embodiment, this equation correctly implies that the centering error is directly proportional to the difference in the optical power measurements of the right and left-justified signals after they have been filtered by the wavelength splitter.

In order for this equation (21) to be substantially accurate, the initial difference between the carrier wavelengths of the right justified signals and the left justified signals must be less than $\lambda_{spacing}$. Also, the shape of the passbands on either side of stopbands must be symmetrical. Passbands described by Gaussian transfer functions or by cosine transfer functions are examples of wavelength splitters familiar to those skilled in the art that exhibit this symmetry. Furthermore the value of $A_{min}$ must be substantially greater than $A_{max}$. Those skilled in the art will be aware that most wavelength splitter technologies used for DWDM applications provide values of $A_{min}$ that are greater than $A_{max}$ by a factor of 100 or more. The symmetry of the passbands and the large value of $A_{min}$ relative to $A_{max}$ maintain the constant proportionality between the centering error, $\lambda_{RCE}$, and the difference between the optical power of the filtered signals.

Although the examples describing the present invention have utilized thermoelectric coolers (TECs) 48, 50, 94 to adjust the position of the passbands of the wavelength combiners and wavelength splitters, it is understood that this invention does not depend upon the specific techniques used to adjust them. For example, resistive heaters are also commonly used to adjust the passband locations of the wavelength splitters and wavelength combiners. Furthermore, micro-electromechanical technologies (MEMS) are also used to adjust the passbands of the wavelength splitters and wavelength combiners. The present invention does not depend on the manner in which the passbands of the wavelength splitters and wavelength combiners are adjusted. The present invention simply requires that the passbands be adjustable without regard to how they are adjusted. The TEC's were used for illustrative purposes only, both to describe embodiments and to show that the adjustments are straightforward.

Therefore, it can be seen that the use of wavelength combiners 44 and 46 in transmitter 10 to lock the lasers 12 and 14 to the correct wavelengths greatly improves the stability and accuracy of lasers 12 and 14 relative to wavelength combiners 44 and 46. Also, the utilization of wavelength combiners 44 and 46 performs the filtering needed on the modulated optical signals as well as multiplexing of the signal onto a single optical path for transmission. As a result, the present transmitter is simple in operation and has low optical loss. Wavelength splitter 82 within receiver 80 provides similar advantages. The utilization of wavelength splitter 82 performs the additional filtering on the unwanted sideband of each signal, while at the same time, demultiplexing the two vestigial sideband signals from one optical path onto two optical paths suitable for processing by the receivers 84 and 86.

Whereas the present invention has been described with respect to specific embodiments thereof, it will be understood that various changes and modifications will be suggested to one skilled in the art and it is intended to encompass such changes and modifications as fall within the scope of the appended claims.

The invention claimed is:

1. An optical vestigial sideband transmitter comprising:
   a first intensity-modulated light source having an adjustable center wavelength for generating a first intensity-modulated optical signal;
   a second intensity-modulated light source having an adjustable center wavelength for generating a second intensity-modulated optical signal;
   a first optical splitter coupled to said first intensity-modulated light source;
   a second optical splitter coupled to said second intensity-modulated light source;
   a first wavelength combiner for receiving a portion of said first and second modulated signals from said first and second optical splitters;
   a second wavelength combiner for receiving a portion of said first and second modulated signals from said first and second optical splitters;
   said first wavelength combiner filtering said first and second modulated signals to generate two signals, each having a vestigial sideband spectrum, and multiplexing said signals for output to an optical transmission medium;
   said second wavelength combiner operating with a filter spectrum shifted by 180° compared to said first wavelength combiner; and
   a filter for measuring optical power output from each vestigial sideband signal emerging from said first and second wavelength combiners and for generating a control signal to regulate temperature of said first and second light sources to control central carrier wavelengths of said sources and to regulate temperature of said first and second wavelength combiners, such that the total output power of said first wavelength combiner is substantially equal to the total output power of said second wavelength combiner and such that the output power of each vestigial sideband signal emerging from each wavelength combiner is also equal.

2. An optical vestigial sideband transmitter for transmitting carrier wavelengths in multiple optical channels each channel having a center wavelength, the transmitter including:
   means for locating the carrier wavelengths offset from the center wavelength of each optical channel, including
   a first of the channels, having a carrier wavelength adjustable in response to a control input,
   a control loop, responsive to a signal in said first channel and a signal in a second channel adjacent the first channel, performing differential power measurements derived from the signals in said first and second channels and controlling the control input to adjust the carrier wavelength in the first channel to be offset from the center wavelength of the first channel.

3. The transmitter of claim 2, further including:
   means for locating the carrier wavelength offset from the center wavelength in opposite directions in alternating optical channels.

4. The transmitter of claim 2, comprising
   a first light source having an adjustable carrier wavelength, for generating a first modulated optical signal;
   a second light source, having an adjustable carrier wavelength, for generating a second modulated optical signal;
   a first optical splitter coupled to said first light source;
   a second optical splitter coupled to said second light source;
   a first wavelength combiner for receiving a portion of said first and second modulated signals from said first and second optical splitters;
   a second wavelength combiner for receiving a portion of said first and second modulated signals from said first and second optical splitters;
   said first wavelength combiner filtering said first and second modulated signals to generate two resulting signals, each having a vestigial sideband spectrum, and combining said resulting signals for output to an optical transmission medium; and
   said second wavelength combiner operating with a filter spectrum shifted compared to said first wavelength combiner,
   wherein said control loop measures optical power output from the resulting vestigial sideband signals from said first and second wavelength combiners and controls the control input to adjust the carrier wavelengths of said sources.

5. The transmitter of claim 4, wherein said second wavelength combiner operates with a filter spectrum shifted by 180° compared to said first wavelength combiner.

6. The transmitter of claim 5, wherein said control loop, in response to the measured optical power, adjusts the filter spectrum of at least one of the wavelength combiners to be shifted by 180° from the other of the wavelength combiners.

7. The transmitter of claim 6, wherein the control loop controls the control input such that the total output power of said first wavelength combiner is substantially equal to the total output power of said second wavelength combiner.

8. The transmitter of claim 4, wherein the control loop controls the control input such that the total output power of said first wavelength combiner is substantially equal to the total output power of said second wavelength combiner.

9. An optical vestigial sideband receiver comprising:
   a wavelength splitter for demultiplexing input vestigial sideband signals having right and left justified vestigial sideband signals onto multiple optical light paths, such that the right-justified vestigial sideband signals and the left-justified vestigial sideband signals occupy separate output optical light paths from said wavelength splitter;
   a first receiver for receiving said right justified vestigial sideband signal;
   a second receiver for receiving said left justified vestigial sideband signal; and
   said first and second receivers detecting the difference between optical power input to said first and second receivers, and from said difference generating a control signal applied to control the passbands of said wavelength splitter relative to the received vestigial sideband signals, said control signal controlling the passbands so that a stopband separating the passband is centered between the wavelengths of the right and left justified vestigial sideband signals, for proper filtering of the vestigial sideband signals.

* * * * *